US012706311B2

(12) United States Patent
Visser et al.

(10) Patent No.: US 12,706,311 B2
(45) Date of Patent: Aug. 11, 2026

(54) TWO-LAYER DIELECTRIC COATING

(71) Applicant: PPG Industries Ohio, Inc., Cleveland, OH (US)

(72) Inventors: Sijmen J. Visser, Marken (NL); Brian E. Woodworth, Glenshaw, PA (US); Holli A. Gonder-Jones, Akron, OH (US); John R. Schneider, Allison Park, PA (US); Kelly L. Moore, Dunbar, PA (US); Mark L. Follet, Allison Park, PA (US); Liang Ma, Allison Park, PA (US); Calum H. Munro, Gibsonia, PA (US); Marvin M. Pollum, Jr., Pittsburgh, PA (US); Maria S. French, Berkshire (GB); Allison G. Condie, Valencia, PA (US); Amy E. Harrison, Monroeville, PA (US); Irina G. Schwendeman, Wexford, PA (US); Daniel K. Dei, Pittsburgh, PA (US); Cassandra Noelle Bancroft, Fairview Park, OH (US); Christopher Apanius, Moreland Hills, OH (US); Kevin T. Sylvester, Pittsburgh, PA (US); Corey J. Dedomenic, Trafford, PA (US); Egle Puodziukynaite, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 731 days.

(21) Appl. No.: 17/905,063

(22) PCT Filed: Feb. 26, 2021

(86) PCT No.: PCT/US2021/019895
§ 371 (c)(1),
(2) Date: Aug. 25, 2022

(87) PCT Pub. No.: WO2021/173991
PCT Pub. Date: Sep. 2, 2021

(65) Prior Publication Data

US 2023/0143426 A1 May 11, 2023

Related U.S. Application Data

(60) Provisional application No. 62/981,943, filed on Feb. 26, 2020.

(51) Int. Cl.
*H01M 4/62* (2006.01)
*H01M 4/04* (2006.01)

(52) U.S. Cl.
CPC .......... *H01M 4/623* (2013.01); *H01M 4/045* (2013.01); *H01M 2220/20* (2013.01)

(58) Field of Classification Search
None
See application file for complete search history.

(56) References Cited

U.S. PATENT DOCUMENTS 3,455,806 A 7/1969 Spoor et al.
3,793,278 A 2/1974 De Bona
3,928,157 A 12/1975 Suematsu et al.
3,937,679 A 2/1976 Bosso et al.
3,947,338 A 3/1976 Jerabek et al.
3,962,165 A 6/1976 Bosso et al.
3,975,346 A 8/1976 Bosso et al.
3,984,299 A 10/1976 Jerabek
4,001,156 A 1/1977 Bosso et al.
4,031,050 A 6/1977 Jerabek
4,104,147 A 8/1978 Marchetti et al.
4,345,057 A 8/1982 Yamabe et al.
4,420,574 A 12/1983 Moriarity et al.
4,423,166 A 12/1983 Moriarity et al.
4,432,850 A 2/1984 Moriarity et al.
4,452,963 A 6/1984 Moriarity
4,793,867 A 12/1988 Charles et al.
4,812,215 A 3/1989 Karabin et al.
5,015,671 A * 5/1991 Ono .................. C08G 59/4014 523/420
5,588,989 A 12/1996 Vonk et al.
5,747,557 A 5/1998 Hanyu et al.
6,017,432 A 1/2000 Boyd et al.
6,093,298 A 7/2000 Kaylo et al.
6,165,338 A 12/2000 December et al.
7,749,368 B2 7/2010 McMurdie et al.
7,842,762 B2 11/2010 Zawacky et al.

(Continued)

FOREIGN PATENT DOCUMENTS

CN 1964797 A 5/2007
CN 101068861 A 11/2007
CN 101962465 A 2/2011
CN 115087709 A 9/2022
CN 115244144 A 10/2022
EP 0012463 B1 6/1982
EP 3389086 A1 10/2018
JP 52-065534 A 5/1977

(Continued)

OTHER PUBLICATIONS

International Search Report and Written Opinion received for PCT Application Serial No. PCT/US2021/019895 dated Jun. 11, 2021, 10 pages.

*Primary Examiner* — Cheng Yuan Huang

(57) ABSTRACT

The present invention is directed towards a system for coating a substrate comprising an electrodepositable coating composition and a powder coating composition. Also disclosed are coated substrates comprising a first coating layer comprising an electrodepositable coating layer, and a second coating layer comprising a powder coating layer on at least a portion of the first coating layer, as well as methods of coating substrates.

20 Claims, No Drawings

(56) References Cited

U.S. PATENT DOCUMENTS

| | | | | |
|---|---|---|---|---|
| 7,862,851 | B2 * | 1/2011 | Wonnemann | C08G 59/42 204/488 |
| 8,673,091 | B2 | 3/2014 | McMillen et al. | |
| 9,181,628 | B2 | 11/2015 | Valko et al. | |
| 9,562,175 | B2 | 2/2017 | Asay et al. | |
| 2003/0054193 | A1 | 3/2003 | McCollum et al. | |
| 2005/0065294 | A1 | 3/2005 | Cramer et al. | |
| 2007/0224337 | A1 | 9/2007 | Wonnemann et al. | |
| 2009/0045071 | A1 | 2/2009 | Valko et al. | |
| 2012/0024703 | A1 | 2/2012 | Poole | |
| 2012/0129980 | A1 | 5/2012 | Desai et al. | |
| 2013/0306477 | A1 | 11/2013 | Hsu et al. | |
| 2014/0192500 | A1 | 7/2014 | Yeong et al. | |
| 2015/0240113 | A1 | 8/2015 | Pratt et al. | |
| 2018/0002545 | A1 | 1/2018 | Eswarakrishnan et al. | |
| 2018/0297301 | A1 | 10/2018 | Narayanasamy et al. | |

FOREIGN PATENT DOCUMENTS

| | | | | |
|---|---|---|---|---|
| JP | 2010097865 | A | 4/2010 | |
| WO | WO-0146319 | A1 * | 6/2001 | C09B 67/0086 |
| WO | 2007118024 | A1 | 10/2007 | |
| WO | WO-2012059491 | A1 * | 5/2012 | C09D 7/40 |
| WO | 2018160799 | A1 | 9/2018 | |
| WO | 2018187755 | A1 | 10/2018 | |

* cited by examiner

TWO-LAYER DIELECTRIC COATING

FIELD OF THE INVENTION

The present invention is directed towards two-layer dielectric coatings, systems for coating substrates, methods for coating substrates, and coated substrates.

BACKGROUND INFORMATION

Substrates, such as metal substrates including metal electrical components and batteries, are often protected with a high dielectric strength material to provide insulating properties. For example, components have been coated with a dielectric tapes and coatings to provide insulating properties. While dielectric tapes and coatings can provide insulating properties, they can be difficult to apply uniformly to substrates. In addition, it can be difficult to obtain good insulating properties at low coating film thicknesses. Thus, it is desirable to develop improved dielectric coatings and coating systems that provide more uniform coatings with high dielectric strength.

SUMMARY OF THE INVENTION

Disclosed herein is a system for coating a substrate comprising an electrodepositable coating composition and a powder coating composition.

Also disclosed herein is a coated substrate comprising a first coating layer comprising an electrodepositable coating layer, and a second coating layer comprising a powder coating layer on at least a portion of the first coating layer, wherein the substrate comprises a battery or a battery component.

Further disclosed herein is a coated substrate comprising a first coating layer comprising an electrodepositable coating layer, and a second coating layer comprising a powder coating layer on at least a portion of the first coating layer, wherein the coating layers comprise a multi-layer dielectric coating having a dielectric strength of at least 1 kV at any of the combined dry film thicknesses described herein, as measured by a Sefelec Dielectrimeter RMG12AC-DC and in accordance ASTM D 149-09 Hipot test, such as at least 2 kV, such as at least 2.5 kV, such as at least 5 kV, such as at least 7 kV, such as at least 8 kV, such as at least 10 kV, such as at least 12 kV.

Also disclosed herein is a coated substrate comprising a first coating layer comprising an electrodepositable coating layer, and a second coating layer comprising a powder coating layer on at least a portion of the first coating layer, wherein the coating layers comprise a multi-layer dielectric coating having a dielectric strength of at least 1 kV at a total combined dry film thickness of 250 microns or less, as measured by a Sefelec Dielectrimeter RMG12AC-DC and in accordance ASTM D 149-09 Hipot test, such as at least 2 kV, such as at least 2.5 kV, such as at least 5 kV, such as at least 7 kV, such as at least 8 kV, such as at least 10 kV, such as at least 12 kV.

Further disclosed herein is a method of coating a substrate comprising electrodepositing an electrodepositable coating layer deposited from an electrodepositable coating composition onto a surface of the substrate and applying a powder coating layer on to at least a portion of the electrodepositable coating layer, wherein the substrate comprises a battery or a battery component.

DETAILED DESCRIPTION OF THE INVENTION

As stated above, the present invention is directed to a system for coating a substrate comprising an electrodepositable coating composition and a powder coating composition.

Electrodepositable Coating Composition

As used herein, the term "electrodepositable coating composition" refers to a composition that is capable of being deposited onto an electrically conductive substrate under the influence of an applied electrical potential.

According to the present invention, the electrodepositable coating composition further comprises an ionic salt group-containing film-forming polymer having functional groups.

The ionic salt group-containing film-forming polymer may comprise a cationic salt group-containing film-forming polymer or an anionic salt group-containing film-forming polymer.

As stated above, the ionic salt group-containing film-forming polymer may comprise a cationic salt group-containing film-forming polymer. The cationic salt group-containing film-forming polymer may be used in a cationic electrodepositable coating composition. As used herein, the term "cationic salt group-containing film-forming polymer" refers to polymers that include at least partially neutralized cationic groups, such as sulfonium groups and ammonium groups, that impart a positive charge.

The cationic salt group-containing film-forming polymer comprises functional groups. The functional groups of the cationic salt group-containing film-forming polymer may comprise active hydrogen functional groups. The term "active hydrogen" refers to hydrogens which, because of their position in the molecule, display activity according to the Zerewitinoff test, as described in the JOURNAL OF THE AMERICAN CHEMICAL SOCIETY, Vol. 49, page 3181 (1927). Accordingly, active hydrogens include hydrogen atoms attached to oxygen, nitrogen, or sulfur, and thus useful compounds will include those having at least two hydroxyl, thiol, primary amine, and/or secondary amine groups (in any combination). Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing film-forming polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and 3,928,157 at col. 2, line 29 to col. 3, line 21, these portions of both of which are incorporated herein by reference, may be used.

Besides amine salt group-containing resins, quaternary ammonium salt group-containing resins may also be employed as a cationic salt group-containing film-forming polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; 3,975,346 at col. 1, line 62 to col. 17, line 25 and 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at pg. 2, line 1 to pg. 6, line 25, this portion of which being incorporated herein by reference, may also be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in United States Patent Application Publication No. 2003/0054193 A1 at paragraphs [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication No. 2003/0054193 A1 at paragraphs [0096] to [0123], this portion of which being incorporated herein by reference.

The active hydrogen-containing, cationic salt group-containing film-forming polymer is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula.

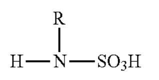

wherein R is hydrogen or an alkyl group having 1 to 4 carbon atoms. Mixtures of the above mentioned acids also may be used in the present invention.

The extent of neutralization of the cationic salt group-containing film-forming polymer may vary with the particular polymer involved. However, sufficient acid should be used to sufficiently neutralize the cationic salt-group containing film-forming polymer such that the cationic salt-group containing film-forming polymer may be dispersed in an aqueous dispersing medium. For example, the amount of acid used may provide at least 20% of all of the total theoretical neutralization. Excess acid may also be used beyond the amount required for 100% total theoretical neutralization. For example, the amount of acid used to neutralize the cationic salt group-containing film-forming polymer may be ≥0.1% based on the total amines in the active hydrogen-containing, cationic salt group-containing film-forming polymer. Alternatively, the amount of acid used to neutralize the active hydrogen-containing, cationic salt group-containing film-forming polymer may be ≤100% based on the total amines in the active hydrogen-containing, cationic salt group-containing film-forming polymer. The total amount of acid used to neutralize the cationic salt group-containing film-forming polymer may range between any combination of values, which were recited in the preceding sentences, inclusive of the recited values. For example, the total amount of acid used to neutralize the active hydrogen-containing, cationic salt group-containing film-forming polymer may be 20%, 35%, 50%, 60%, or 80% based on the total amines in the cationic salt group-containing film-forming polymer.

According to the present invention, the cationic salt group-containing film-forming polymer may be present in the cationic electrodepositable coating composition in an amount of at least 40% by weight, such as at least 50% by weight, such as at least 60% by weight, and may be present in the in an amount of no more than 90% by weight, such as no more than 80% by weight, such as no more than 75% by weight, based on the total weight of the resin solids of the electrodepositable coating composition. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition.

According to the present invention, the ionic salt group containing film-forming polymer may comprise an anionic salt group containing film-forming polymer. As used herein, the term "anionic salt group containing film-forming polymer" refers to an anionic polymer comprising at least partially neutralized anionic functional groups, such as carboxylic acid and phosphoric acid groups that impart a negative charge.

The anionic salt group-containing film-forming polymer comprises functional groups. The functional groups of the anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers. The anionic salt group containing film-forming polymer may be used in an anionic electrodepositable coating composition.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference. Also suitable are resins comprising one or more pendent carbamate functional groups, such as those described in U.S. Pat. No. 6,165,338.

According to the present invention, the anionic salt group-containing film-forming polymer may be present in the anionic electrodepositable coating composition in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the electrodepositable coating composition. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition.

According to the present invention, the electrodepositable coating composition of the present invention may further comprise a curing agent. The curing agent is reactive with functional groups on the film-forming polymer. For example, the curing agent may react with the reactive groups, such as active hydrogen groups, of the ionic salt group-containing film-forming polymer to effectuate cure of the coating composition to form a coating. As used herein, the term "cure", "cured" or similar terms, as used in connection with the electrodepositable coating compositions described herein, means that at least a portion of the components that form the electrodepositable coating composition are crosslinked to form a coating. Additionally, curing of the electrodepositable coating composition refers to subjecting said composition to curing conditions (e.g., elevated temperature) leading to the reaction of the reactive functional groups of the components of the electrodepositable coating composition, and resulting in the crosslinking of the components of the composition and formation of an an at least partially cured coating. Non-limiting examples of suitable curing agents are at least partially blocked polyisocyanates, aminoplast resins and phenoplast resins, such as phenol-formaldehyde condensates including allyl ether derivatives thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4,4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may be present in the cationic electrodepositable coating composition in an amount of at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

The electrodepositable coating composition according to the present invention may comprise one or more further components in addition to the ionic salt group-containing film-forming polymer and the curing agent described above.

The electrodepositable coating composition may comprise a fluoropolymer. Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minnesota under the name FLUORAD; and perfluorinated hydroxyl functional (meth)acrylate resins.

According to the present invention, the electrodepositable coating composition comprises an aqueous medium comprising water and optionally one or more organic solvent(s). The aqueous medium be present in amounts of, for example, 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

According to the present invention, the total solids content of the electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 60 minutes for cationic electrodepositable coating compositions, and materials which will not volatilize when heated to 150° C. for 60 minutes for anionic electrodepositable coating compositions.

According to the present invention, the electrodepositable coating composition may optionally comprise a catalyst to catalyze the reaction between the curing agent and the polymers. Examples of catalysts suitable for cationic electrodepositable coating compositions include, without limitation, organotin compounds (e.g., dibutyltin oxide and dioctyltin oxide) and salts thereof (e.g., dibutyltin diacetate); zinc amidines; other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. Examples of catalysts suitable for anionic electrodepositable coating compositions include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

According to the present invention, the electrodepositable coating composition may be substantially free of tin. As used herein, an electrodepositable coating composition is substantially free of tin if tin is present in an amount of less than 0.1% by weight, based on the total weight of the resin blend solids. The electrodepositable coating composition may be essentially free of tin. As used herein, an electrodepositable coating composition may be essentially free of tin if tin is present in an amount of less than 0.01% by weight, based on the total weight of the resin blend solids. The electrodepositable coating composition may be completely free of tin. As used here, an electrodepositable coating composition is completely free of tin if tin is not present in the composition, i.e., 0.00% by weight, based on the total resin blend solids.

According to the present invention, the electrodepositable coating composition may optionally further comprise a phyllosilicate pigment. As used herein, the term "phyllosilicate" refers to a group of minerals having sheets of silicates having a basic structure based on interconnected six membered rings of $SiO_4^{-4}$ tetrahedra that extend outward in infinite sheets where 3 out of the 4 oxygens from each tetrahedra are shared with other tetrahedra resulting in phyllosilicates having the basic structural unit of $Si_2O_5^{-2}$. Phyllosilicates may comprise hydroxide ions located at the center of the tetrahedra and/or cations such as, for example, $Fe^{+2}$, $Mg^{+2}$, or $Al^{+3}$, that form cation layers between the silicate sheets where the cations may coordinate with the oxygen of the silicate layer and/or the hydroxide ions. The term "phyllosilicate pigment" refers to pigment materials comprising phyllosilicates. Non-limiting examples of phyllosilicate pigments includes the micas, chlorites, serpentine, talc, and the clay minerals. The clay minerals include, for example, kaolin clay and smectite clay. The sheet-like structure of the phyllosilicate pigment tends to result in pigment having a plate-like structure, although the pigment can be manipulated (such as through mechanical means) to have other particle structures. These pigments when exposed to liquid media may or may not swell and may or may not have leachable components (e.g.: ions that may be drawn towards the liquid media).

The phyllosilicate pigment may comprise a plate-like pigment. For example, the phyllosilicate pigment may comprise a plate-like mica pigment, a plate-like chlorite pigment, a plate-like serpentine pigment, a plate-like talc pigment, and/or a plate-like clay pigment. The plate-like clay pigment may comprise kaolin clay, smectite clay, or a combination thereof.

Alternatively, or in addition to the phyllosilicate pigment, the electrodepositable coating composition may optionally further comprise a thermally conductive, electrically insulative filler material, as that term is defined herein. Any of the thermally conductive, electrically insulative filler materials disclosed herein with respect to the powder coating composition may be used in the electrodepositable coating composition.

Alternatively, or in addition to the phyllosilicate pigment and/or thermally conductive, electrically insulating filler material, the electrodepositable coating composition may optionally further comprise a thermally conductive, electrically conductive filler, as that term is defined herein. Any of the thermally conductive, electrically conductive filler materials disclosed herein with respect to the powder coating composition may be used in the electrodepositable coating composition.

The electrodepositable coating composition may optionally further comprise a dispersing agent when pigment is present in the electrodepositable coating composition. As used herein, the term "dispersing agent" refers to a material capable of forming a chemical complex with the pigment and may assist in promoting dispersion of the pigment.

The dispersing agent may comprise a dispersing acid. The dispersing acid may be a monoprotic acid or polyprotic acid. As used herein, the term "polyprotic acid" refers to chemical compounds having more than one acidic proton. As used herein, the term "acidic proton" refers to a proton that forms part of an acid group, including, but not limited to, oxyacids of phosphorus, carboxylic acids, oxyacids of sulfur, and the like.

The dispersing acid may comprise a first acidic proton having a pKa of at least 1.1, such as at least 1.5, such as at least 1.8. The dispersing acid may comprise a first acidic proton having a pKa of no more than 4.6, such as no more than 4.0, such as no more than 3.5. The dispersing acid may comprise a first acidic proton having a pKa of 1.1 to 4.6, such as 1.5 to 4.0, such as 1.8 to 3.5.

The dispersing acid may comprise a carboxylic acid, an oxyacid of phosphorus (such as phosphoric acid or phosphonic acid), or a combination thereof.

The ratio of the weight of pigment to moles of dispersing agent may be at least 0.25 g/mmol, such as at least 0.5 g/mmol, such as at least 1.0 g/mmol, such as at least 1.5 g/mmol, such as at least 1.75 g/mmol. The ratio of the weight of pigment to moles of dispersing agent may be no more than 25 g/mmol, such as no more than 15 g/mmol, such as no more than 10 g/mmol, such as no more than 8.25 g/mmol, such as no more than 6.5 g/mmol, such as no more than 5.0 g/mmol. The ratio of the weight of phyllosilicate pigment to moles of dispersing agent may be in the amount of 0.25 to 25 g/mmol, such as 0.25 to 15 g/mmol, such as 0.25 to 10 g/mmol, such as 0.25 to 8.25 g/mmol, such as 0.25 to 6.5 g/mmol, such as 0.25 to 5.0 g/mmol, such as 0.5 to 25 g/mmol, such as 0.5 to 15 g/mmol, such as 0.5 to 10 g/mmol, such as 0.5 to 8.25 g/mmol, such as 0.5 to 6.5 g/mmol, such as 0.5 to 5.0 g/mmol, such as 1 to 25 g/mmol, such as 1 to 15 g/mmol, such as 1 to 10 g/mmol, such as 1 to 8.25 g/mmol, such as 1 to 6.5 g/mmol, such as 1 to 5.0 g/mmol, such as 1.5 to 25 g/mmol, such as 1.5 to 15 g/mmol, such as 1.5 to 10 g/mmol, such as 1.5 to 8.25 g/mmol, such as 1.5 to 6.5 g/mmol, such as 1.5 to 5.0 g/mmol, such as 1.75 to 25 g/mmol, such as 1.75 to 15 g/mmol, such as 1.75 to 10 g/mmol, such as 1.75 to 8.25 g/mmol, such as 1.75 to 6.5 g/mmol, such as 1.75 to 5.0 g/mmol.

The pigment and dispersing agent may optionally form a complex, and the pigment-dispersing agent complex of the present invention may optionally have an overall anionic charge. As used herein, the term "complex" refers to a substance formed by the chemical interaction, such as ionic bonding, covalent bonding, and/or hydrogen bonding, between two distinct chemical species. As used herein, the term "overall anionic charge" with respect to the complex means that the complex is at least partially negatively charged and may have some portions positively charged, but the negative charges are greater than the positive charges such that the complex has an anionic charged. These species will generally be part of a dispersion phase having one component or multiple components that is not soluble in the bulk media and other component(s) that are soluble in the bulk material.

The pigment-to-binder (P:B) ratio as set forth in this invention may refer to the weight ratio of the pigment-to-binder in the electrocoat bath composition, and/or the weight ratio of the pigment-to-binder in the deposited wet film, and/or the weight ratio of the pigment to the binder in the dry, uncured deposited film, and/or the weight ratio of the pigment-to-binder in the cured film. The pigment-to-binder (P:B) ratio of the pigment to the cationic electrodepositable binder may be at least 0.05:1, such as at least 0.10:1, such as at least 0.20:1, such as at least 0.25:1, such as at least 0.30:1, such as at least 0.35:1, such as at least 0.40:1, such as at least 0.50:1, such as at least 0.60:1, such as at least 0.75:1, such as at least 1:1, such as at least 1.25:1, such as at least 1.5:1. The pigment-to-binder (P:B) ratio of the pigment to the cationic electrodepositable binder may be no more than 2.0:1, such as no more than 1.75:1, such no more than 1.5:1, such as no more than 1.25:1, such as no more than 1:1, such as no more than 0.75:1, such as no more than 0.70:1, such as no more than 0.60:1, such as no more than 0.55:1, such as no more than 0.50:1. The pigment-to-binder (P:B) ratio of the pigment to the cationic electrodepositable binder may be 0.2:1 to 2.0:1, such as 0.2:1 to 1.75:1, such as 0.2:1 to 1.50:1, such as 0.2:1 to 1.25:1, such as 0.2:1 to 1:1, such as 0.2:1 to 0.75:1, such as 0.2:1 to 0.70:1, such as 0.2:1 to 0.60:1, such as 0.2:1 to 0.55:1, such as 0.2:1 to 0.50:1, such as 0.25:1 to 2.0:1, such as 0.25:1 to 1.75:1, such as 0.25:1 to 1.50:1, such as 0.25:1 to 1.25:1, such as 0.25:1 to 1:1, such as 0.25:1 to 0.75:1, such as 0.25:1 to 0.70:1, such as 0.25:1 to 0.60:1, such as 0.25:1 to 0.55:1, such as 0.25:1 to 0.50:1, such as 0.3:1 to 2.0:1, such as 0.3:1 to 1.75:1, such as 0.3:1 to 1.50:1, such as 0.3:1 to 1.25:1, such as 0.3:1 to 1:1, such as 0.3:1 to 0.75:1, such as 0.3:1 to 0.70:1, such as 0.3:1 to 0.60:1, such as 0.3:1 to 0.55:1, such as 0.3:1 to 0.50:1, such as 0.35:1 to 2.0:1, such as 0.35:1 to 1.75:1, such as 0.35:1 to 1.50:1, such as 0.35:1 to 1.25:1, such as 0.35:1 to 1:1, such as 0.35:1 to 0.75:1, such as 0.35:1 to 0.70:1, such as 0.35:1 to 0.60:1, such as 0.35:1 to 0.55:1, such as 0.35:1 to 0.50:1, such as 0.4:1 to 2.0:1, such as 0.4:1 to 1.75:1, such as 0.4:1 to 1.50:1, such as 0.4:1 to 1.25:1, such as 0.4:1 to 1:1, such as 0.4:1 to 0.75:1, such as 0.4:1 to 0.70:1, such as 0.4:1 to 0.60:1, such as 0.4:1 to 0.55:1, such as 0.4:1 to 0.50:1, such as 0.5:1 to 2.0:1, such as 0.5:1 to 1.75:1, such as 0.5:1 to 1.50:1, such as 0.5:1 to 1.25:1, such as 0.5:1 to 1:1, such as 0.5:1 to 0.75:1, such as 0.5:1 to 0.70:1, such as 0.5:1 to 0.60:1, such as 0.5:1 to 0.55:1, such as 0.6:1 to 2.0:1, such as 0.6:1 to 1.75:1, such as 0.6:1 to 1.50:1, such as 0.6:1 to 1.25:1, such as 0.6:1 to 1:1, such as 0.6:1 to 0.75:1, such as 0.6:1 to 0.70:1, such as 0.75:1 to 2.0:1, such as 0.75:1 to 1.75:1, such as 0.75:1 to 1.50:1, such as 0.75:1 to 1.25:1, such as 0.75:1 to 1:1, such as 1:1 to 2.0:1, such as 1:1 to 1.75:1, such as 1:1 to 1.50:1, such as 1:1 to 1.25:1, such as 1.25:1 to 2.0:1, such as 1.25:1 to 1.75:1, such as 1.25:1 to 1.50:1, such as 1.50:1 to 2.0:1, such as 1.50:1 to 1.75:1.

The dispersing agent may be present in an amount of at least 0.1% by weight, such as at least 0.3% by weight, such as at least 0.5% by weight, such as at least 0.7% by weight, such as at least 0.8% by weight, such as 1% by weight, based on the total solids weight of the composition. The dispersing agent may be present in an amount of no more than 10% by weight, such as no more than 7.5% by weight, such as no more than 5% by weight, such as no more than 3% by weight, such as no more than 2% by weight, such as no more than 1.5% by weight, such as no more than 1% by weight, such as no more than 0.8% by weight, based on the total solids weight of the composition. The dispersing agent may be present in an amount of 0.1% to 10% by weight, such as 0.1% to 7.5% by weight, such as 0.1% to 5% by weight, such as 0.1% to 3% by weight, such as 0.1% to 2% by weight, such as 0.1% to 1.5% by weight, such as 0.1% to 1% by weight, such as 0.1% to 0.8% by weight, such as 0.3% to 10% by weight, such as 0.3% to 7.5% by weight, such as 0.3% to 5% by weight, such as 0.3% to 3% by weight, such as 0.3% to 2% by weight, such as 0.3% to 1.5% by weight, such as 0.3% to 1% by weight, such as 0.3% to 0.8% by weight, such as 0.5% to 10% by weight, such as 0.5% to 7.5% by weight, such as 0.5% to 5% by weight, such as 0.5% to 3% by weight, such as 0.5% to 2% by weight, such as 0.5% to 1.5% by weight, such as 0.5% to 1% by weight, such as 0.5% to 0.8% by weight, such as 0.7% to 10% by weight, such as 0.7% to 7.5% by weight, such as 0.7% to 5% by weight, such as 0.7% to 3% by weight, such as 0.7% to 2% by weight, such as 0.7% to 1.5% by weight, such as 0.7% to 1% by weight, such as 0.7% to 0.8% by weight, such as 0.8% to 10% by weight, such as 0.8% to 7.5% by weight, such as 0.8% to 5% by weight, such as 0.8% to 3% by weight, such as 0.8% to 2% by weight, such as 0.8% to 1.5% by weight, such as 0.8% to 1% by weight, such as 1% to 10% by weight, such as 1% to 7.5% by weight, such as 1% to 5% by weight, such as 1% to 3% by weight, such as 1% to 2% by weight, such as 1% to 1.5% by weight, such as 1% to 1% by weight, such as 1% to 0.8% by weight, based on the total solids weight of the composition.

According to the present invention, the electrodepositable coating composition may comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof. Alternatively, the electrodepositable coating composition may be completely free of any of the optional ingredients, i.e., the optional ingredient is not present in the electrodepositable coating composition. The pigment composition may comprise, for example, iron oxides, lead oxides, strontium chromate, carbon black, coal dust, titanium dioxide, talc, barium sulfate, as well as color pigments such as cadmium yellow, cadmium red, chromium yellow and the like. The other additives mentioned above may be present in the electrodepositable coating composition in amounts of 0.01% to 3% by weight, based on total weight of the resin solids of the electrodepositable coating composition.

The electrodepositable coating composition of the present invention may optionally further comprise a polybutadiene polyol. As used herein, the term "polybutadiene polyol" refers to polymers comprising the residue of polybutadiene, and optionally other monomers, that do not include a significant amount of the residue of a farnesene monomer, for example, less than 1% by weight of the constitutional units comprise the residue of a farnesene monomer, such as less than 0.1% by weight, based on the total weight of the polybutadiene polymer. Suitable polybutadiene polyols include the KRASOL LBH family of polybutadiene polyols and the POLY BD family of polybutadiene polyols, each available from Cray Valley.

The polybutadiene polyol may be present in the electrodepositable coating composition in an amount of at least 0.1% by weight, such as at least 0.5% by weight, such as at least 0.75% by weight, based on the total resin solids weight of the composition. The polybutadiene polyol may be present in the electrodepositable coating composition in an amount of no more than 10% by weight, such as no more than 4% by weight, such as no more than 3% by weight, such as no more than 2% by weight, such as no more than 1% by weight, based on the total resin solids weight of the composition. The polybutadiene polyol may be present in the electrodepositable coating composition in an amount of from 0.1% by weight to 10% by weight, such as 0.1% to 4% by weight, such as 0.1% to 3% by weight, such as 0.1% to 2% by weight, such as 0.1% to 1% by weight, such as 0.5% by weight to 4% by weight, such as 0.75% by weight to 3% by weight, based on the total resin solids weight of the composition.

Alternatively, the electrodepositable coating composition may be substantially free, essentially free, or completely free of polybutadiene polyol. As used herein, the composition is "substantially free" of polybutadiene polyol if polybutadiene polyol is present, if at all, in an amount of no more than 0.1% by weight, based on the total resin solids of the composition. As used herein, the composition is "essentially free" of polybutadiene polyol if polybutadiene polyol is present, if at all, in an amount of no more than 0.01% by weight, based on the total resin solids of the composition. As used herein, the composition is "completely free" of polybutadiene polyol if polybutadiene polyol is not present, i.e., 0.000% by weight, based on the total resin solids of the composition.

The electrodepositable coating composition of the present invention may optionally further comprise a polybutylene oxide polymer. The polybutylene oxide polymer which may comprise a copolymer of butylene oxide and propylene oxide, such as, for example, a block, gradient, alternate or random copolymer. According to the present invention, the molar ratio of butylene oxide to propylene oxide may be at least 1:1, such as at least 3:1, such as at least 5:1, and in some instances, may be no more than 50:1, such as no more than 30:1, such as no more than 20:1. According to the present invention, the molar ratio of butylene oxide to propylene oxide may be 1:1 to 50:1, such as 3:1 to 30:1, such as 5:1 to 20:1.

The polybutylene oxide polymer comprises at least two hydroxyl functional groups, and may be difunctional, trifunctional, tetrafunctional, or more. The hydroxyl equivalent weight of the polybutylene oxide polymer may be at least 100 g/mol, such as at least 200 g/mol, such as at least 400 g/mol, and may be no more than 2,000 g/mol, such as no more than 1,000 g/mol, such as no more than 800 g/mol. The hydroxyl equivalent weight of the polybutylene oxide polymer may be 100 g/mol to 2,000 g/mol, such as 200 g/mol to 1,000 g/mol, such as 400 g/mol to 800 g/mol. As used herein, the "hydroxyl equivalent weight" is theoretical and determined by dividing the molecular weight of the polybutylene oxide polymer by the number of hydroxyl groups present in the polybutylene oxide polymer.

The polybutylene oxide polymer may be present in the electrodepositable coating composition, if at all, in an amount of 0.1% to 10% by weight, such as 0.5% to 4% by weight, such as 0.75% to 3% by weight, based on the total resin solids weight of the composition.

The polybutylene oxide polymer may have a z-average molecular weight (Mz) of 200 g/mol to 5,000 g/mol, such as 400 g/mol to 3,000 g/mol, such as 600 g/mol to 2,000 g/mol. As used herein, the term "z-average molecular weight ($M_z$)" means the z-average molecular weight ($M_z$) as determined by Gel Permeation Chromatography using Waters 2695 separation module with a Waters 410 differential refractometer (RI detector), polystyrene standards having molecular weights of from approximately 500 g/mol to 900,000 g/mol, tetrahydrofuran (THF) with lithium bromide(LiBr) as the eluent at a flow rate of 0.5 mL/min, and one Asahipak GF-510 HQ column for separation.

Alternatively, the electrodepositable coating composition may be substantially free, essentially free, or completely free of a polybutylene oxide polymer.

According to the present invention, the electrodepositable coating composition may optionally further comprise a polyetheramine-adduct comprising an ungelled ionic reaction product prepared from reactants comprising: (a) a reaction product prepared from reactants comprising: (1) a polyol; and (2) an epoxy functional material; and (b) a polyetheramine.

Examples of suitable polyols useful for forming the ungelled ionic reaction product include resorcinol, dihydroxy benzene, aliphatic, cycloaliphatic or aralaphatic hydroxyl containing compounds, such as ethylene glycol, propylene glycol, bisphenol A, dihydroxyl cyclohexane, dimethylol cyclohexane, or combinations thereof. The polyol may be present in the polyetheramine adduct in an amount of about 0% to 20% by weight based on the total weight of the reactants that form the polyester reaction product, such as 0% to 15% by weight.

Examples of suitable epoxy-functional materials useful for forming the ungelled ionic reaction product contain at least one epoxy group in the molecule, such as di- or polyglycidyl ethers of polyhydric alcohols, such as a polyglycidyl ether of bisphenol A. Suitable epoxy-functional materials may have an epoxy equivalent weight ranging from about 90 to about 2000, as measured by titration with perchloric acid using methyl violet as an indicator. The epoxy-functional material may comprise about 10% to 40% by weight based on the total weight of the epoxy functional polyester, such as 15% to 35% by weight of the epoxy functional material is combined or reacted with the polyether described above to form the epoxy functional polyester.

According to the present invention, the polyetheramine adduct may be formed by reacting the ungelled ionic reaction product with at least one polyetheramine such as one characterized by propylene oxide, ethylene oxide, or mixed propylene oxide and ethylene oxide repeating units in their respective structures, such as, for example, one of the Jeffamine series products (commercially available from Huntsman Corporation). Examples of such polyetheramines include aminated propoxylated pentaerythritols, such as Jeffamine XTJ-616, and those represented by Formulas (I) through (III).

According to Formula (I) of the present invention the polyetheramine may comprise or represent:

(I)

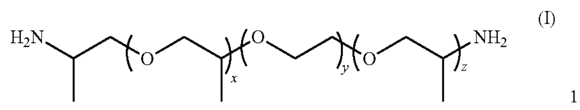

wherein y=0-39, x+z=1-68.

Suitable polyetheramines represented by Formula (I) include, but are not limited to, amine-terminated polyethylene glycol such as Huntsman Corporation Jeffamine ED series, such as Jeffamine HK-511, Jeffamine ED-600, Jeffamine ED-900 and Jeffamine ED-2003, and amine-terminated polypropylene glycol such as Huntsman Corporation Jeffamine D series, such as Jeffamine D-230, Jeffamine D-400, Jeffamine D-2000 and Jeffamine D-4000.

According to Formula (II) of the present invention the polyetheramine may comprise or represent:

(II)

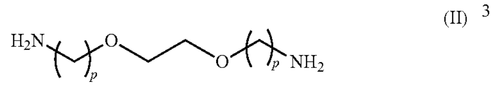

wherein each p independently is 2 or 3.

Suitable polyetheramines represented by Formula (II) include, but are not limited to, amine-terminated polyethylene glycol based diamine, such as Huntsman Corporation Jeffamine EDR series, such as Jeffamine EDR-148 and Jeffamine EDR-176.

According to Formula (III) of the present invention the polyetheramine may comprise or represent:

(III)

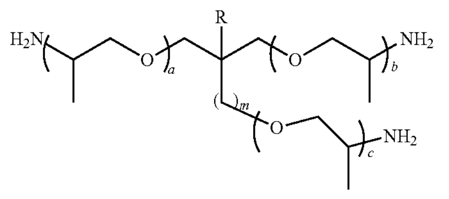

wherein R is H or $C_2H_5$, m=0 or 1, a+b+c=5-85.

Suitable polyetheramines represented by Formula (III) include, but are not limited to, amine-terminated propoxylated trimethylolpropane or glycerol, such as Huntsman Corporation Jeffamine T series, such as Jeffamine T-403, Jeffamine T-3000 and Jeffamine T-5000.

Further examples of the polyetheramine-adduct are those described in U.S. Pat. Nos. 4,420,574, and 4,423,166, which are incorporated herein by reference.

According to the present invention, the polyetheramine-adduct may be present in the electrodepositable coating composition in an amount of 1% to 20% by weight based on the total weight of the resin blend solids, such as 3% to 15% by weight, such as 5% to 13% by weight.

Alternatively, the electrodepositable coating composition may be substantially free, essentially free, or completely free of a polyetheramine-adduct.

According to the present invention, the electrodepositable coating composition optionally may further comprise a polyamine-dialdehyde adduct comprising, or in some cases consisting of, or in some cases consisting essentially of, a polymerization product of a polyamine and a dialdehyde. Suitable polyamine-dialdehyde adducts are described in, for example, U.S. Publication No. 2018/0002545A1, at paragraphs [0010] through [0028], the cited portion of which is incorporated herein by reference. For example, the polyamine-dialdehyde adduct may comprise an adduct of a polyamine and glyoxal.

The polyamine-dialdehyde adduct may be present in the electrodepositable coating composition, if at all, in an amount of 0.1% to 10% by weight, such as 0.5% to 7% by weight, such as 0.75% to 5% by weight, such as 1% to 4% by weight, based on the total resin solids weight of composition.

Alternatively, the electrodepositable coating composition may be substantially free, essentially free, or completely free of a polyamine-dialdehyde adduct.

According to the present invention, the electrodepositable coating composition optionally may further comprise an epoxy microgel. A non-limiting example of a suitable epoxy microgel is provided in U.S. Pub. No. 2012/0024703 A1 at Example 3, the cited portion of which is incorporated herein by reference.

The epoxy microgel may be present in the electrodepositable coating composition, if at all, in an amount of 0.1% to 10% by weight, such as 0.5% to 4% by weight, such as 0.75% to 3% by weight, based on the total resin solids weight of composition.

Alternatively, the electrodepositable coating composition may be substantially free, essentially free, or completely free of an epoxy microgel.

According to the present invention, the electrodepositable coating composition optionally may further comprise an acrylic microgel. A non-limiting example of a suitable acrylic microgel is provided in U.S. Pub. No. 2013/0306477 A1 at paragraphs [0012] through [0040], the cited portion of which is incorporated herein by reference.

The acrylic microgel may be present in the electrodepositable coating composition, if at all, in an amount of 0.1% to 10% by weight, such as 0.5% to 4% by weight, such as 0.75% to 3% by weight, based on the total resin solids weight of composition.

Alternatively, the electrodepositable coating composition may be substantially free, essentially free, or completely free of an acrylic microgel.

According to the present invention, the electrodepositable coating composition optionally may further comprise an acrylic polymer comprising a polymerization product of a polymeric dispersant and a second stage ethylenically unsaturated monomer composition comprising greater than 40% by weight of a second stage hydroxyl-functional (meth) acrylate monomer, based on the total weight of the second stage ethylenically unsaturated monomer. A non-limiting example of an acrylic polymer is provided in Int'l Pub. No. WO 2018/160799 A1 at paragraphs [0013] through [0061], the cited portion of which is incorporated herein by reference.

The acrylic polymer may be present in the electrodepositable coating composition, if at all, in an amount of 0.1% to 10% by weight, such as 0.5% to 4% by weight, such as 0.75% to 3% by weight, based on the total resin solids weight of composition.

Alternatively, the electrodepositable coating composition may be substantially free, essentially free, or completely free of an acrylic polymer comprising a polymerization product of a polymeric dispersant and a second stage ethylenically unsaturated monomer composition comprising greater than 40% by weight of a second stage hydroxyl-functional (meth) acrylate monomer, based on the total weight of the second stage ethylenically unsaturated monomer.

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film from the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film from the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 50 microns.

The electrodepositable coating composition may comprise a composition having improved edge coverage. For example, sharp edges have a naturally higher potential to attract charged coating particles of the electrodepositable coating composition than flat surfaces. "Sharp edge(s)" can refer to edges that have been stamped, sheared, machine cut, laser cut and the like. Thus, sharp edges tend to have a higher "wet film" build than the neighboring flat surfaces. However, surface tension effects can pull the coating away from the sharp edge(s) during flow/cure in some circumstances. Accordingly, an electrodepositable coating composition having improved edge coverage is a composition that reduces the flow of the coating during cure and maintains sufficient coating coverage over the edge. The electrodepositable coating composition may comprise a composition comprising film-forming polymers and/or additives that improve edge coverage performance of the applied coating over the substrate. These materials have a lower tendency to flow and are able to effectively resist surface tension and remain in place.

Powder Coating Composition

As stated above, the system of the present invention further comprises a powder coating composition. As used herein, a "powder coating composition" refers to a coating composition embodied in solid particulate form as opposed to liquid form.

According to the present invention, the powder coating composition comprises a binder. As used herein, a "binder" refers to a constituent material that typically holds all coating composition components together upon cure. The binder comprises one or more film-forming resins that can be used to form the coating layer. As used herein, a "film-forming resin" refers to a resin that can form a self-supporting continuous film on at least a horizontal surface of a substrate upon removal of any diluents or carriers present in the composition and/or upon curing. The term "resin" is used interchangeably with "polymer," and the term polymer refers to oligomers, homopolymers (e.g., prepared from a single monomer species), copolymers (e.g., prepared from at least two monomer species), terpolymers (e.g., prepared from at least three monomer species), and graft polymers.

The powder coating compositions used with the present invention can include any of a variety of thermosetting powder coating compositions known in the art. As used herein, the term "thermosetting" refers to compositions that "set" irreversibly upon curing or crosslinking, wherein polymer chains of polymeric components are joined together by covalent bonds. This property is usually associated with a cross-linking reaction of the composition constituents often induced, for example, by heat or radiation. Once cured or crosslinked, a thermosetting resin will not melt upon the application of heat and is insoluble in most solvents.

The powder coating compositions used with the present invention can also include thermoplastic powder coating compositions. As used herein, the term "thermoplastic" refers to compositions that include polymeric components that are not joined by covalent bonds after baking to form a coating and, thereby, can undergo liquid flow upon heating without crosslinking.

Non-limiting examples of suitable film-forming resins that form at least a portion of the binder of the powder coating composition include (meth)acrylate resins, polyurethanes, polyesters, polyamides, polyethers, polysiloxanes, epoxy resins, vinyl resins, copolymers thereof, and combinations thereof. Further, the film-forming resins can have any of a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), ethylenically unsaturated groups, and any combination thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof.

Non-limiting examples of crosslinkers include phenolic resins, amino resins, epoxy resins, triglycidyl isocyanurate (TGIC), beta-hydroxy (alkyl) amides, alkylated carbamates, (meth)acrylates, salts of poly carboxylic acids with cyclic amidine, o-tolyl biguanide, isocyanates, blocked isocyanates, polyacids, anhydrides, organometallic acid-functional materials, polyamines, polyamides, aminoplasts, carbodiimides, oxazolines, and combinations thereof.

The powder coating compositions can also be substantially free, essentially free, or completely free of any of the previously described film-forming resins and/or crosslinkers. For example, the powder coating composition can be substantially free, essentially free, or completely free of a hydroxyl functional film-forming resin and/or an isocyanate functional crosslinker. The term "substantially free" as used in this context means the powder coating composition contains less than 1000 parts per million (ppm), "essentially free" means less than 100 ppm, and "completely free" means less than 20 parts per billion (ppb) of a certain film-forming resin and/or crosslinker such as a hydroxyl functional film-forming resin and/or an isocyanate functional crosslinker, based on the total weight of the powder coating composition.

The curable powder coating composition of the present invention can be cured with heat, increased or reduced pressure, chemically such as with moisture, or with other means such as actinic radiation, and combinations thereof. The term "actinic radiation" refers to electromagnetic radiation that can initiate chemical reactions. Actinic radiation includes, but is not limited to, visible light, ultraviolet (UV) light, infrared radiation, X-ray, and gamma radiation. As used herein, the terms "curable", "cure", and the like, as used in connection with a powder coating composition, means that at least a portion of the components that make up the powder coating composition are polymerizable and/or crosslinkable including self-crosslinkable polymers.

As mentioned above, the binder of the powder coating composition may comprise one or more film-forming resins and one or more crosslinkers. A binder that comprises two or more film-forming resins may be referred to as a hybrid binder. For example, the film-forming resin of the binder may comprise, consist essentially of, or consist of at least two of (meth)acrylate resins, polyurethanes, polyesters, polyamides, polyethers, polysiloxanes, epoxy resins, vinyl resins, or copolymers thereof. In addition, the binder may comprise a crosslinker comprising, consisting essentially of, or consisting of one of or a combination of phenolic resins, amino resins, epoxy resins, triglycidyl isocyanurate, beta-hydroxy (alkyl) amides, alkylated carbamates, (meth)acrylates, salts of poly carboxylic acids with cyclic amidine, o-tolyl biguanide isocyanates, blocked isocyanates, polyacids, anhydrides, organometallic acid-functional materials, polyamines, polyamides, aminoplasts, carbodiimides, or oxazolines.

Alternatively, the binder of the powder coating composition may comprise, consist essentially of, or consist of a single film-forming resin. For example, the film-forming resin of the binder may comprise, consist essentially of, or consist of one of (meth)acrylate resins, polyurethanes, polyesters, polyamides, polyethers, polysiloxanes, epoxy resins, vinyl resins, or copolymers thereof, without a second resin present that is different than the first resin. In addition, the binder may comprise a crosslinker comprising, consisting essentially of, or consisting of one of or a combination of phenolic resins, amino resins, epoxy resins, triglycidyl isocyanurate, beta-hydroxy (alkyl) amides, alkylated carbamates, (meth)acrylates, isocyanates, blocked isocyanates, polyacids, anhydrides, organometallic acid-functional materials, polyamines, polyamides, aminoplasts, carbodiimides, or oxazolines.

The binder of the powder coating composition may comprise, consist essentially of, or consist of film-forming resins having the same reactive functionality. For example, the film-forming resin may comprise two or more epoxy functional film-forming resins.

The film-forming resin may be present in the binder in an amount of at least 10% by weight, such as at least 20% by weight, at least 30% by weight, or at least 40% by weight, based on the total weight of the binder. The film-forming resin can be present in the binder in an amount of up to 97% by weight, such as up to 80% by weight, such as up to 60% by weight, such as up to 50% by weight, based on the total weight of the binder. The film-forming resin may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder.

The film-forming resin may comprise a single film-forming resin comprising may comprise, consist essentially of, or consist of one of (meth)acrylate resins, polyurethanes, polyesters, polyamides, polyethers, polysiloxanes, epoxy resins, vinyl resins, or copolymers thereof in an amount of at least 10 weight %, at least 20 weight %, at least 30 weight %, or at least 40 weight % of the powder coating composition, based on the total weight of the binder. The film-forming resin may comprise a single film-forming resin comprising may comprise, consist essentially of, or consist of one of (meth)acrylate resins, polyurethanes, polyesters, polyamides, polyethers, polysiloxanes, epoxy resins, vinyl resins, or copolymers thereof in an amount of up to 97% by weight, such as up to 80% by weight, such as up to 60 weight %, such as up to 50 weight % of the powder coating composition, based on the total weight of the binder. The film-forming resin may comprise a single film-forming resin comprising may comprise, consist essentially of, or consist of one of (meth)acrylate resins, polyurethanes, polyesters, polyamides, polyethers, polysiloxanes, epoxy resins, vinyl resins, or copolymers thereof in an amount of from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder.

The crosslinker may be present in the binder an amount of at least 3% by weight, such as at least 10% by weight, such as at least 20% by weight, such as at least 30% by weight, such as at least 40% by weight, based on the total weight of the binder. The crosslinker may be present in the binder an amount of up to 70 weight %, such as up to 60 weight %, such as up to 50 weight %, such as up to 40% by weight, based on the total weight of the binder. The crosslinker may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

A non-limiting example of a hybrid binder of the powder coating composition is a binder comprising: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth) acrylate polymer reactive with the epoxy functional polymer. It is appreciated that the epoxy functional polymer, poly-carboxylic acid functional polyester polymer, and poly-carboxylic acid functional (meth)acrylate polymer can react to form a hydroxyl functional reaction product.

As used herein, a "poly-carboxylic acid functional polymer" refers to a polymer having two or more carboxylic acid functional groups. The poly-carboxylic acid functional polyester polymer used in the powder coating composition of the present invention can have an acid value of less than 100 mg KOH/g or less than 80 mg KOH/g. The poly-carboxylic acid functional polyester polymer can further have an acid value of at least 60 mg KOH/g. The poly-carboxylic acid functional polyester polymer can also have, for example, an acid value of from 60 mg KOH/g to 100 mg KOH/g, or from 60 mg KOH/g to 80 mg KOH/g. The poly-carboxylic acid functional polyester polymer can be formed from various materials such as poly(ethylene terephthalate) for example.

The poly-carboxylic acid functional polyester polymer can comprise at least 20 weight %, at least 25 weight %, at least 30 weight %, at least 35 weight %, or at least 40 weight % of the powder coating composition, based on the total solids weight of the powder coating composition. The poly-carboxylic acid functional polyester polymer can comprise up to 97 weight % or up to 60 weight % or up to 50 weight % of the powder coating composition, based on the total solids weight of the powder coating composition. The poly-carboxylic acid functional polyester polymer can also comprise an amount within a range such as from 20 to 97 weight % or from 20 to 60 weight % or from 30 to 50 weight % of the powder coating composition, based on the total solids weight of the powder coating composition.

As indicated, the powder coating composition also comprises a poly-carboxylic acid functional (meth)acrylate polymer. The poly-carboxylic acid functional (meth)acrylate polymer can comprise at least 0.05 weight %, at least 0.1 weight %, at least 0.5 weight %, at least 1 weight %, or at least 2 weight % of the powder coating composition, based on the total solids weight of the powder coating composition. The poly-carboxylic acid functional (meth)acrylate polymer can comprise up to 10 weight %, up to 5 weight %, or up to 3 weight % of the powder coating composition, based on the total solids weight of the powder coating composition. The poly-carboxylic acid functional (meth) acrylate polymer can also comprise an amount within a range such as from 0.05 to 10 weight %, or from 0.1 to 5 weight %, or from 1 to 3 weight % of the powder coating composition, based on the total solids weight of the powder coating composition.

The poly-carboxylic acid functional polyester polymer and the poly-carboxylic acid functional (meth)acrylate polymer can be combined in the powder coating composition to provide a desired weight ratio. For example, the poly-carboxylic acid functional polyester polymer and the poly-carboxylic acid functional (meth)acrylate polymer can be combined in the powder coating composition to provide a weight ratio of the poly-carboxylic acid functional polyester polymer to the poly-carboxylic acid functional (meth)acrylate polymer of 1:1 or greater, or 5:1 or greater, or 10:1 or greater, or 15:1 or greater, or 20:1 or greater.

The powder coating composition can also include additional carboxylic acid functional polymers including, but not limited to, carboxylic acid functional polyurethane polymers, polyamide polymers, polyether polymers, polysiloxane polymers, vinyl resins, copolymers thereof, and combinations thereof. Further, any of the previously described carboxylic acid functional polymers can have any of a variety of additional functional groups including, but not limited to, amine groups, hydroxyl groups, thiol groups, carbamate groups, amide groups, urea groups, and combinations thereof. Alternatively, the powder coating composition of the present invention can be free of such additional poly-carboxylic acid functional polymers.

The total amount of carboxylic acid functional polymers can comprise at least 20 weight %, at least 30 weight %, or at least 40 weight % of the powder coating composition, based on the total solids weight of the powder coating composition. The total amount of carboxylic acid functional polymers can comprise up to 70 weight %, up to 60 weight %, or up to 50 weight % of the powder coating composition, based on the total solids weight of the powder coating composition. The total amount of carboxylic acid functional polymers can also comprise an amount within a range such as from 20 to 70 weight %, or from 30 to 60 weight %, or from 40 to 50 weight % of the powder coating composition, based on the total solids weight of the powder coating composition.

The carboxylic acid functional polymers can also be formed from recycled materials. For example, the powder coating composition of the present invention can comprise a poly-carboxylic acid functional polyester prepared from at least one recycled material. A non-limiting example of a recycled material that can be used to form the poly-carboxylic acid functional polyester is recycled poly(ethylene terephthalate).

As previously described, the exemplary powder coating composition of the present invention also comprises an epoxy functional polymer that is reactive with at least the poly-carboxylic acid functional polyester polymer and the poly-carboxylic acid functional (meth)acrylate polymer. It is appreciated that the epoxy functional polymer comprises two or more epoxy functional groups and acts as a cross-linker when reacted with the carboxylic acid functional polymers. Non-limiting examples of suitable epoxy functional polymers include, but are not limited to, diglycidyl ethers of bisphenol A, polyglycidyl ethers of polyhydric alcohols, polyglycidyl esters of polycarboxylic acids, and combinations thereof. Non-limiting examples of suitable epoxy resins are also commercially available from NanYa Plastics under the trade name NPES-903, and from Hexion under the trade names EPON™ 2002 and EPON 2004™.

The epoxy functional polymer can have an equivalent weight of at least 200 or at least 500 or at least 700. The epoxy functional polymer can also comprise an equivalent weight of up to 1000 or up to 5100. The epoxy functional polymer can comprise an equivalent weight within the range of 200 to 5100 or from 200 to 1000 or from 500 to 5100 or from 500 to 1000 or from 700 to 5100 or from 700 to 1000. As used herein, "equivalent weight" refers to the average weight molecular weight of a resin divided by the number of functional groups. As such, the equivalent weight of the epoxy functional polymer is determined by dividing the average weight molecular weight of the epoxy resin by the total number of epoxide groups and any other optional functional groups that are not an epoxide. Further, the average weight molecular weight is determined by gel permeation chromatography relative to linear polystyrene standards of 800 to 900,000 Daltons as measured with a Waters 2695 separation module with a Waters 410 differential refractometer (RI detector). Tetrahydrofuran (THF) is used as the eluent at a flow rate of 1 ml min-1, and two PLgel Mixed-C (300×7.5 mm) columns is used for separation.

It is appreciated that the epoxy functional polymer can comprise one or multiple types of epoxy functional polymers. When multiple epoxy functional polymers are used, the multiple epoxy functional polymers can have the same or different equivalent weights. For instance, a first epoxy functional polymer can have an equivalent weight that is greater than an equivalent weight of a second epoxy functional polymer. The epoxy functional polymers can also include additional functional groups besides the epoxy functional groups including, but not limited to, any of the previously described functional groups. Alternatively, the epoxy functional polymer can be free of any one, or all, of the previously described functional groups besides the epoxy functional groups.

The epoxy functional polymer can comprise at least 10 weight %, at least 20 weight %, at least 30 weight %, or at least 40 weight % of the powder coating composition, based on the total solids weight of the powder coating composition. The epoxy functional polymer can comprise up to 95 weight % or up to 60 weight % or up to 50 weight % of the powder coating composition, based on the total solids weight of the coating composition. The epoxy functional polymer can also comprise an amount within a range such as from 10 to 95 weight %, or from 20 to 60 weight %, or from 30 to 50 weight %, or from 40 to 50 weight % of the powder coating composition, based on the total solids weight of the powder coating composition.

The poly-carboxylic acid functional polyester polymer and the epoxy functional polymer can also be combined in the powder coating composition to provide a desired weight ratio. For example, the poly-carboxylic acid functional polyester polymer and the epoxy functional polymer can be combined in the powder coating composition to provide a weight ratio of the poly-carboxylic acid functional polyester polymer to the epoxy functional polymer of 0.2:1 to 1:1, or from 0.5:1 to 1:0.5, or from 0.8:1 to 1:0.8, or from 0.9:1 to 1:0.9, or from 0.95:1 to 1:0.95, or at a ratio of 1:1.

The carboxylic acid functional polymers and the epoxy functional polymer of the powder coating composition are reacted to form a reaction product comprising hydroxyl functional groups. The reaction product can comprise one or multiple hydroxyl groups. For example, the reaction product can comprise multiple pendant hydroxyl groups and, optionally, terminal hydroxyl groups.

The powder coating composition of the present invention can also comprise, as discussed above, an isocyanate functional crosslinker that is reactive with the previously described reaction product comprising hydroxyl functional groups. The isocyanate crosslinker can provide additional properties including, for example, a higher crosslink density for increased chemical and abrasion resistance.

The isocyanate functional crosslinker can include various types of polyisocyanates. Polyisocyanates that can be used include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CFIDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or FIDI), 1,4-butylene diisocyanate, lysine diisocyanate, 1, 4-methylene bis-(cyclohexyl isocyanate), toluene diisocyanate (TDI), m-xylylenediisocyanate (MXDI) and p-xylylenediisocyanate, 4-chloro-1,3-phenyl ene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

The isocyanate crosslinker can comprise a blocked isocyanate functional crosslinker. A "blocked isocyanate" refers to a compound with isocyanate functional groups that have been reacted with a blocking agent and which prevents the isocyanate functionality from reacting until the blocking agent is removed upon exposure to an external stimulus such as heat. Non-limiting examples of blocking agents include phenols, pyridinols, thiophenols, methylethylketoxime, amides, caprolactam, imidazoles, and pyrazoles. The isocyanate can also include a uretdione isocyanate such as a uretdione internally blocked isocyanate adduct.

The isocyanate functional crosslinker can comprise at least 0.1 weight %, at least 1 weight %, or at least 3 weight % of the powder coating composition, based on the total solids weight of the powder coating composition. The isocyanate functional crosslinker can comprise up to 50 weight %, up to 30 weight %, up to 20 weight %, up to 10 weight %, up to 8 weight %, or up to 5 weight % of the powder coating composition, based on the total solids weight of the powder coating composition. The isocyanate functional crosslinker can also comprise an amount within a range such as from 0.1 to 50 weight %, or from 0.1 to 30 weight %, or from 0.1 to 20 weight %, or from 0.1 to 10 weight %, or from 0.1 to 8 weight %, or from 0.1 to 5 weight %, or from 1 to 50 weight %, or from 1 to 30 weight %, or from 1 to 20 weight %, or from 1 to 10 weight %, or from 1 to 8 weight %, or from 1 to 5 weight %, or from 3 to 50 weight %, or from 3 to 30 weight %, or from 3 to 20 weight %, or from 3 to 10 weight %, or from 3 to 8 weight %, or from 3 to 5 weight %, based on the total solids weight of the powder coating composition.

A non-limiting example of a binder of the powder coating composition is a binder comprising, consisting essentially of, or consisting of (a) an epoxy functional polymer; and (b) a crosslinker. The epoxy functional polymer may be present in an amount of at least 10% by weight, such as at least 20% by weight, at least 30% by weight, or at least 40% by weight, based on the total weight of the binder. The epoxy functional polymer may be present in the binder in an amount of up to 97% by weight, such as up to 80% by weight, such as up to 60% by weight, such as up to 50% by weight, based on the total weight of the binder. The epoxy functional polymer may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder. The crosslinker may be present in the binder an amount of at least 3% by weight, such as at least 10% by weight, such as at least 20% by weight, such as at least 30% by weight, such as at least 40% by weight, based on the total weight of the binder. The crosslinker may be present in the binder an amount of up to 70 weight %, such as up to 60 weight %, such as up to 50 weight %, such as up to 40% by weight, based on the total weight of the binder. The crosslinker may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

A non-limiting example of a binder of the powder coating composition is a binder comprising, consisting essentially of, or consisting of (a) polyester resin; and (b) a crosslinker. The polyester resin may be present in an amount of at least 10% by weight, such as at least 20% by weight, at least 30% by weight, or at least 40% by weight, based on the total weight of the binder. The polyester resin may be present in the binder in an amount of up to 97% by weight, such as up to 80% by weight, such as up to 60% by weight, such as up to 50% by weight, based on the total weight of the binder. The polyester resin may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder. The crosslinker may be present in the binder an amount of at least 3% by weight, such as at least 10% by weight, such as at least 20% by weight, such as at least 30% by weight, such as at least 40% by weight, based on the total weight of the binder. The crosslinker may be present in the binder an amount of up to 70 weight %, such as up to 60 weight %, such as up to 50 weight %, such as up to 40% by weight, based on the total weight of the binder. The cross-linker may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

A non-limiting example of a binder of the powder coating composition is a binder comprising, consisting essentially of, or consisting of (a) a polyester resin; and (b) a crosslinker comprising a polyisocyanate. The polyester resin may be present in an amount of at least 10% by weight, such as at least 20% by weight, at least 30% by weight, or at least 40% by weight, based on the total weight of the binder. The polyester resin may be present in the binder in an amount of up to 97% by weight, such as up to 80% by weight, such as up to 60% by weight, such as up to 50% by weight, based on the total weight of the binder. The polyester resin may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder. The polyisocyanate may be present in the binder an amount of at least 3% by weight, such as at least 10% by weight, such as at least 20% by weight, such as at least 30% by weight, such as at least 40% by weight, based on the total weight of the binder. The polyisocyanate may be present in the binder an amount of up to 70 weight %, such as up to 60 weight %, such as up to 50 weight %, such as up to 40% by weight, based on the total weight of the binder. The polyisocyanate may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

The binder may be present in the powder coating composition in an amount of at least 10% by weight, such as at least 20% by weight, such as at least 40% by weight, such as at least 50% by weight, based on the total weight of the powder coating composition. The binder may be present in the powder coating composition in an amount of 100% by weight, such as no more than 97% by weight, such as no more than 85% by weight, such as no more than 75% by weight, such as no more than 65% by weight, based on the total weight of the powder coating composition. The binder may be present in an amount of 10% to 100% by weight, such as 10% to 97% by weight, such as 10% to 85% by weight, such as 10% to 75% by weight, such as 10% to 65% by weight, such as 20% to 100% by weight, such as 20% to 97% by weight, such as 20% to 85% by weight, such as 20% to 75% by weight, such as 20% to 65% by weight, such as 40% to 100% by weight, such as 40% to 97% by weight, such as 40% to 85% by weight, such as 40% to 75% by weight, such as 40% to 65% by weight, such as 50% to 100% by weight, such as 50% to 97% by weight, such as 50% to 85% by weight, such as 50% to 75% by weight, such as 50% to 65% by weight, based on the total weight of the powder coating composition.

The binder may be present in the powder coating composition in an amount of at least 15% by volume, such as at least 30% by volume, such as at least 50% by volume, based on the total volume of the powder coating composition. The binder may be present in the powder coating composition in an amount of 100% by volume, such as no more than 96% by volume, such as no more than 70% by volume, such as no more than 55% by volume, based on the total volume of the powder coating composition. The binder may be present in an amount of 15% to 100% by volume, such as 15% to 96% by volume, such as 15% to 80% by volume, such as 15% to 60% by volume, such as 25% to 100% by volume, such as 25% to 96% by volume, such as 35% to 60% by volume, such as 35% to 100% by volume, such as 35% to 96% by volume, such as 35% to 80% by volume, such as 35% to 60% by volume, based on the total volume of the powder coating composition.

According to the present invention, the powder coating composition optionally may comprise an electrically insulative filler. As used herein, the term "electrically insulative filler" means a pigment, filler, or inorganic powder that has a volume resistivity of at least 10 am (measured according to ASTM D257, C611, or B193). For example, the electrically insulative filler may have a volume resistivity of at least 10 Ω·m (measured according to ASTM D257, C611, or B193), such as at least 20 Ω·m, such as at least 30 Ω·m, such as at least 40 Ω·m, such as at least 50 Ω·m, such as at least 60 Ω·m, such as at least 60 Ω·m, such as at least 70 Ω·m, such as at least 80 Ω·m, such as at least 80 Ω·m, such as at least 90 Ω·m, such as at least 100 Ω·m.

The electrically insulative filler may comprise a thermally conductive, electrically insulative filler material. As used herein, the term "thermally conductive, electrically insulative filler" or "TC/EI filler" means a pigment, filler, or inorganic powder that has a thermal conductivity of at least 5 W/m·K at 25° C. (measured according to ASTM D7984) and a volume resistivity of at least 10 Ω·m (measured according to ASTM D257, C611, or B193). The TC/EI filler material may comprise organic or inorganic material and may comprise particles of a single type of filler material or may comprise particles of two or more types of TC/EI filler materials. That is, the TC/EI filler material may comprise particles of a first TC/EI filler material and may further comprise particles of at least a second (i.e., a second, a third, a fourth, etc.) TC/EI filler material that is different from the first TC/EI filler material. As used herein with respect to types of filler material, reference to "first," "second", etc. is for convenience only and does not refer to order of addition or the like.

The TC/EI filler material may have a thermal conductivity of at least 5 W/m·K at 25° C. (measured according to ASTM D7984), such as at least 18 W/m·K, such as at least 55 W/m·K. The TC/EI filler material may have a thermal conductivity of no more than 3,000 W/m·K at 25° C. (measured according to ASTM D7984), such as no more than 1,400 W/m·K, such as no more than 450 W/m·K. The TC/EI filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K.

The TC/EI filler material may have a volume resistivity of at least 10 Ω·m (measured according to ASTM D257, C611, or B193), such as at least 20 Ω·m, such as at least 30 Ω·m, such as at least 40 Ω·m, such as at least 50 Ω·m, such as at least 60 Ω·m, such as at least 60 Ω·m, such as at least 70 Ω·m, such as at least 80 Ω·m, such as at least 80 Ω·m, such as at least 90 Ω·m, such as at least 100 Ω·m.

Suitable non-limiting examples of TC/EI filler materials include nitrides, metal oxides, metalloid oxides, metal hydroxides, arsenides, carbides, minerals, ceramics, and diamond. For example, the TC/EI filler material may comprise, consist essentially of, or consist of boron nitride, silicon nitride, aluminum nitride, boron arsenide, aluminum oxide, magnesium oxide, dead burned magnesium oxide, beryllium oxide, silicon dioxide, titanium oxide, zinc oxide, nickel oxide, copper oxide, tin oxide, aluminum hydroxide (i.e., aluminum trihydrate), magnesium hydroxide, boron arsenide, silicon carbide, agate, emery, ceramic microspheres, diamond, or any combination thereof. Non-limiting examples of commercially available TC/EI filler materials of boron nitride include, for example, CarboTherm from Saint-Gobain, CoolFlow and PolarTherm from Momentive, and as hexagonal boron nitride powder available from Panadyne; of aluminum nitride, for example, aluminum nitride powder available from Micron Metals Inc., and as Toyalnite from Toyal; of aluminum oxide include, for example, Microgrit from Micro Abrasives, Nabalox from Nabaltec, Aeroxide from Evonik, and as Alodur from Imerys; of dead burned magnesium oxide include, for example, MagChem® P98 from Martin Marietta Magnesia Specialties; of aluminum hydroxide include, for example, APYRAL from Nabaltec GmbH and aluminum hydroxide from Sibelco; and of ceramic microspheres include, for example, ceramic microspheres from Zeeospheres Ceramics or 3M. These fillers can also be surface modified. For example, surface modified magnesium oxide available as PYROKISUMA 5301K available from Kyowa Chemical Industry Co., Ltd. Alternatively, the TC/EI filler materials may be free of any surface modification.

As used herein, the term "dead burned magnesium oxide" refers to magnesium oxide that has been calcined at high-temperatures (e.g., ranging from 1500° C.-2000° C. in a high temperature shaft kiln) yielding a material with very little reactivity relative to magnesium oxide that has not been calcined.

The TC/EI filler material may be included as a single TC/EI filler material or may be included as a combination of two or more of the TC/EI filler materials described above. For example, the thermally conductive, electrically insulative filler materials comprise, consist essentially of, or consist of at least two of aluminum hydroxide, dead burned magnesium oxide, and boron nitride. For example, the thermally conductive, electrically insulative filler materials comprise, consist essentially of, or consist of aluminum hydroxide and dead burned magnesium oxide. For example, the thermally conductive, electrically insulative filler materials comprise, consist essentially of, or consist of aluminum hydroxide and boron nitride. If more than two TC/EI filler materials are used, the weight ratio between the two TC/EI filler materials may be at least 1:30, such as at least 1:25, such as at least 1:20, such as at least 1:15, such as at least 1:10, such as at least 1:8, such as at least 1:7, such as at least 1:5, such as at least 1:4, such as at least 1:3, such as at least 1:2.5, such as at least 1:2, such as 1:1.5, such as at least 1:1.4, such as at least 1:1.2, such as 1:1, based on the total combined weight of the TC/EI filler material. If more than two TC/EI filler materials are used, the weight ratio between the two TC/EI filler materials may be 1:30 to 30:1, such as 1:25 to 25:1, such as 1:20 to 20:1, such as 1:15 to 15:1, such as 1:10 to 10:1, such as 1:8 to 8:1, such as 1:7 to 7:1, such as 1:5 to 5:1, such as 1:3 to 3:1, such as 1:2 to 2:1, such as 1:1.5 to 1.5:1, such as 1:1.4 to 1.4:1, such as 1:1.2 to 1.2:1, such as 1:2 to 1.4:1, such as 1:2 to 1.5:1, based on the total combined weight of the TC/EI filler material.

For example, the thermally conductive, electrically insulative filler material may comprise, consist essentially of, or consist of aluminum hydroxide in an amount of 1% to 80% by weight, such as 10% to 60% by weight, such as 15% to 50% by weight, such as 20% to 40% by weight, such as 25% to 35% by weight, such as 27% to 33% by weight, and dead burned magnesium oxide in an amount of 1% to 80% by weight, such as 5% to 60% by weight, such as 7% to 50% by weight, such as 10% to 40% by weight, such as 12% to 35% by weight, such as 15% to 30% by weight, such as 17% to 25% by weight, such as 18% to 22% by weight, based on the total weight of the powder coating composition.

For example, the thermally conductive, electrically insulative filler material may comprise, consist essentially of, or consist of aluminum hydroxide in an amount of 1% to 80% by weight, such as 10% to 60% by weight, such as 15% to 50% by weight, such as 20% to 40% by weight, such as 25% to 35% by weight, such as 27% to 33% by weight, and boron nitride in an amount of 1% to 80% by weight, such as 5% to 60% by weight, such as 7% to 50% by weight, such as 10% to 40% by weight, such as 12% to 35% by weight, such as 15% to 30% by weight, such as 17% to 25% by weight, such as 18% to 22% by weight, based on the total weight of the powder coating composition.

For example, the thermally conductive, electrically insulative filler material of the powder coating composition may comprise, consist essentially of, or consist of aluminum hydroxide.

The electrically insulative filler may comprise a non-thermally conductive, electrically insulative filler material. As used herein, the term "non-thermally conductive, electrically insulative filler" or "NTC/EI filler" means a pigment, filler, or inorganic powder that that has a thermal conductivity of less than 5 W/m·K at 25° C. (measured according to ASTM D7984) and a volume resistivity of at least 10 Ω·m (measured according to ASTM D257, C611, or B193). For example, the NTC/EI filler may have a thermal conductivity of less than 5 W/m·K at 25° C. (measured according to ASTM D7984, such no more than 3 W/m·K, such as no more than 1 W/mK, such as no more than 0.1 W/mK, such as no more than 0.05 W/mK. For example, the NTC/EI filler may have a volume resistivity of at least 10 Ω·m (measured according to ASTM D257, C611, or B193), such as at least 20 Ω·m, such as at least 30 Ω·m, such as at least 40 Ω·m, such as at least 50 Ω·m, such as at least 60 Ω·m, such as at least 60 Ω·m, such as at least 70 Ω·m, such as at least 80 Ω·m, such as at least 80 Ω·m, such as at least 90 Ω·m, such as at least 100 Ω·m. The NTC/EI filler material may be organic or inorganic.

Suitable non-limiting examples of NTC/EI filler materials include but are not limited to mica, silica, wollastonite, barium sulfate, calcium carbonate, glass microspheres, clay, or any combination thereof.

As used herein, the term "mica" generally refers to sheet silicate (phyllosilicate) minerals. The mica may comprise muscovite mica. Muscovite mica comprises a phyllosilicate mineral of aluminum and potassium with the formula $KAl_2(AlSi_3O_{10})(F,OH)_2$ or $(KF)_2(Al_2O_3)_3(SiO_2)_6(H_2O)$. Exemplary non-limiting commercially available muscovite mica include products sold under the trade name DakotaPURE™, such as DakotaPURE™ 700, DakotaPURE™ 1500, DakotaPURE™ 2400, DakotaPURE™ 3000, DakotaPURE™ 3500 and DakotaPURE™ 4000, available from Pacer Minerals.

The silica ($SiO_2$) may comprise fumed silica which comprises silica that has been treated with a flame to form a three-dimensional structure. The fumed silica may be untreated or surface treated with a siloxane, such as, for example, polydimethylsiloxane. Exemplary non-limiting commercially available fumed silica includes products solder under the trade name AEROSIL®, such as AEROSIL® R 104, AEROSIL® R 106, AEROSIL® R 202, AEROSIL® R 208, AEROSIL® R 972 commercially available from Evonik Industries and products sold under the trade name HDK® such as HDK® H17 and HDK® H18 commercially available from Wacker Chemie AG.

Wollastonite comprises a calcium inosilicate mineral ($CaSiO_3$) that may contain small amounts of iron, aluminum, magnesium, manganese, titanium and/or potassium. For example, the wollastonite may have a B.E.T. surface area of 1.5 to 2.1 $m^2/g$, such as 1.8 $m^2/g$ and a median particle size of 6 microns to 10 microns, such as 8 microns. Non-limiting examples of commercially available wollastonite include NYAD 400 available from NYCO Minerals, Inc.

The calcium carbonate ($CaCO_3$) may comprise a precipitated calcium carbonate or a ground calcium carbonate. The calcium carbonate may or may not be surface treated with stearic acid. Non-limiting examples of commercially available precipitated calcium carbonate include Ultra-Pflex®, Albafil®, and Albacar HO® available from Specialty Minerals and Winnofil® SPT available from Solvay. Non-limiting examples of commercially available ground calcium carbonate include Duramite™ available from IMERYS and Marblewhite® available from Specialty Minerals.

Useful clay minerals include a non-ionic platy filler such as talc, pyrophyllite, chlorite, vermiculite, or combinations thereof.

The glass microspheres may be hollow borosilicate glass. Non-limiting examples of commercially available glass microspheres include 3M Glass bubbles type VS, K series, and S series available from 3M.

The electrically insulative filler material may have any particle shape or geometry. For example, the electrically insulative filler material may be a regular or irregular shape and may be spherical, ellipsoidal, cubical, platy, acicular (elongated or fibrous), rod-shaped, disk-shaped, prism-shaped, flake-shaped, rock-like, etc., agglomerates thereof, and any combination thereof.

Particles of electrically insulative filler material may have a reported average particle size in at least one dimension of at least 0.01 microns, as reported by the manufacturer, such as at least 2 microns, such as at least 10 microns. Particles of electrically insulative filler material may have a reported average particle size in at least one dimension of no more than 500 microns as reported by the manufacturer, such as no more than 300 microns, such as no more than 200 microns, such as no more than 150 microns. The particles of electrically insulative filler material may have a reported average particle size in at least one dimension of 0.01 microns to 500 microns as reported by the manufacturer, such as 0.1 microns to 300 microns, such as 2 microns to 200 microns, such as 10 microns to 150 microns. Suitable methods of measuring average particle size include measurement using an instrument such as the Quanta 250 FEG SEM or an equivalent instrument.

Particles of electrically insulative filler material of the powder coating composition may have a reported Mohs hardness of at least 1 (based on the Mohs Hardness Scale), such as at least 2, such as at least 3. Particles of electrically insulative filler material of the powder coating composition may have a reported Mohs hardness of no more than 10, such as no more than 8, such as no more than 7. Particles of electrically insulative filler material of the powder coating composition may have a reported Mohs hardness of 1 to 10, such as 2 to 8, such as 3 to 7.

The electrically insulative filler material of the powder coating composition may be present in an amount of at least 1% by weight, such as at least 5% by weight, such as at least 10% by weight, such as at least 20% by weight, such as at least 25% by weight, such as at least 30% by weight, such as at least 35% by weight, such as at least 40% by weight, such as at least 45% by weight, such as at least 50% by weight, such as at least 55% by weight, such as at least 60% by weight, such as at least 65% by weight, such as at least 70% by weight, such as at least 75% by weight, based on the total weight of the powder coating composition. The electrically insulative filler material of the powder coating composition may be present in an amount of no more than 80% by weight, such as no more than 75% by weight, such as no more than 70% by weight, such as no more than 65% by weight, such as no more than 60% by weight, such as no more than 55% by weight, such as no more than 50% by weight, such as no more than 45% by weight, such as no more than 40% by weight, such as no more than 35% by weight, such as no more than 30% by weight, such as no more than 25% by weight, such as no more than 20% by weight, such as no more than 15% by weight, such as no more than 10% by weight, such as no more than 5% by weight, based on the total weight of the powder coating composition. The electrically insulative filler material of the powder coating composition may be present in an amount of 1% to 80% by weight, such as 5% to 80% by weight, such as 10% to 80% by weight, such as 15% to 80% by weight, such as 20% to 80% by weight, such as 25% to 80% by weight, such as 30% to 80% by weight, such as 35% to 80% by weight, such as 40% to 80% by weight, such as 45% to 80% by weight, such as 50% to 80% by weight, such as 55% to 80% by weight, such as 60% to 80% by weight, such as 65% to 80% by weight, such as 70% to 80% by weight, such as 75% to 80% by weight, such as 1% to 70% by weight, such as 5% to 70% by weight, such as 10% to 70% by weight, such as 15% to 70% by weight, such as 20% to 70% by weight, such as 25% to 70% by weight, such as 30% to 70% by weight, such as 35% to 70% by weight, such as 40% to 70% by weight, such as 45% to 70% by weight, such as 50% to 70% by weight, such as 55% to 70% by weight, such as 60% to 70% by weight, such as 65% to 70% by weight, such as 1% to 65% by weight, such as 5% to 65% by weight, such as 10% to 65% by weight, such as 15% to 65% by weight, such as 20% to 65% by weight, such as 25% to 65% by weight, such as 30% to 65% by weight, such as 35% to 65% by weight, such as 40% to 65% by weight, such as 45% to 65% by weight, such as 50% to 65% by weight, such as 55% to 65% by weight, such as 1% to 60% by weight, such as 5% to 60% by weight, such as 10% to 60% by weight, such as 15% to 60% by weight, such as 20% to 60% by weight, such as 25% to 60% by weight, such as 25% to 60% by weight, such as 30% to 60% by weight, such as 35% to 60% by weight, such as 40% to 60% by weight, such as 45% to 60% by weight, such as 50% to 60% by weight, such as 55% to 60% by weight, such as 1% to 55% by weight, such as 5% to 55% by weight, such as 10% to 55% by weight, such as 15% to 55% by weight, such as 20% to 55% by weight, such as 25% to 55% by weight, such as 30% to 55% by weight, such as 35% to 55% by weight, such as 40% to 55% by weight, such as 45% to 55% by weight, such as 1% to 50% by weight, such as 5% to 50% by weight, such as 10% to 50% by weight, such as 15% to 50% by weight, such as 20% to 50% by weight, such as 25% to 50% by weight, such as 30% to 50% by weight, such as 35% to 50% by weight, such as 40% to 50% by weight, such as 45% to 50% by weight, such as 1% to 45% by weight, such as 5% to 45% by weight, such as 10% to 45% by weight, such as 15% to 45% by weight, such as 20% to 45% by weight, such as 25% to 45% by weight, such as 30% to 45% by weight, such as 35% to 45% by weight, such as 40% to 45% by weight, such as 1% to 40% by weight, such as 5% to 40% by weight, such as 10% to 40% by weight, such as 15% to 40% by weight, such as 20% to 40% by weight, such as 25% to 40% by weight, such as 30% to 40% by weight, such as 35% to 40% by weight, such as 1% to 35% by weight, such as 5% to 35% by weight, such as 10% to 35% by weight, such as 15% to 35% by weight, such as 20% to 35% by weight, such as 25% to 35% by weight, such as 30% to 35% by weight, such as 1% to 25% by weight, such as 5% to 25% by weight, such as 10% to 25% by weight, such as 15% to 25% by weight, such as 20% to 25% by weight, such as 1% to 20% by weight, such as 5% to 20% by weight, such as 10% to 20% by weight, such as 15% to 20% by weight, such as 1% to 15% by weight, such as 5% to 15% by weight, such as 10% to 15% by weight, such as 1% to 10% by weight, such as 5% to 10% by weight, based on the total weight of the powder coating composition.

The electrically insulative filler material may be present in an amount of at least 1% by volume, such as at least 1% by volume, such as at least 5% by volume, such as at least 25% by volume, such as at least 30% by volume, based on the total volume of the powder coating composition. The electrically insulative filler material may be present in an amount of no more than 70% by volume, such as no more than 50% by volume, such as no more than 30% by volume, based on the total volume of the powder coating composition. The electrically insulative filler material may be present in an amount of 1% to 70% by volume, such as 5% to 50% by volume, such as 25% to 50% by volume, such as 30% to 50% by volume, based on the total volume of the powder coating composition.

According to the present invention, the powder coating composition and binder may optionally comprise a thermoplastic material. As used herein, the term "thermoplastic material" refers to a compound that has a higher molecular weight than the film-forming resin and crosslinker (if present) of the powder coating composition. The thermoplastic material optionally may be free of functional groups that react with the crosslinker of the powder coating composition under normal cure conditions. The thermoplastic material is part of the binder of the powder coating composition and is different than the film-forming resins and crosslinker (if present) of the binder of thermoset and thermoplastic powder coating compositions described above. The thermoplastic material may comprise a phenoxy resin (a polyhydroxyether resin).

The thermoplastic material may have a melt temperature (Tm) of at least 50° C., such as at least 60° C., such as at least 70° C., such as at least 80° C., such as at least 90° C., such as at least 100° C., such as at least 110° C., such as at least 120° C., such as at least 130° C., such as at least 140° C., such as at least 150° C., such as at least 160° C., such as 120° C.

The thermoplastic material may have a glass transition temperature (Tg) of at least −30° C., such as at least −20° C., such as at least −10° C., such as at least 0° C., such as at least 10° C., such as at least 20° C., such as at least 30° C., such as at least 40° C., such as at least 50° C., such as at least 60° C., such as at least 70° C., such as at least 75° C., such as at least 80° C., such as at least 84° C., such as 84° C.

The thermoplastic material may have a melt index at 200° C. of at least at least 40 g/10 min., such as at least 45 g/10 min., such as at least 50 g/10 min., such as at least 55 g/10 min., such as at least 60 g/10 min., such as 60 g/10 min.

The thermoplastic material may have a melt viscosity at 200° C. of at least 90 Poise, such as at least 95 Poise, such as at least 100 Poise, such as at least 105 Poise, such as at least 110 Poise, such as at least 112 Poise, such as 112 Poise.

The thermoplastic material in a 20% by weight solution in cyclohexanone may have a viscosity range of 180-300 cP, such as 180-280 cP, as measured using a Brookfield viscometer at 25° C.

The thermoplastic material may have a weight average molecular weight of at least 10,000 g/mol, such as at least 15,000 g/mol, such as at least 20,000 g/mol, such as at least 25,000 g/mol, such as at least 30,000 g/mol. The thermoplastic material may have a weight average molecular weight of no more than 1,000,000 g/mol, such as no more than 500,000 g/mol, such as no more than 100,000 g/mol, such as no more than 50,000 g/mol, such as no more than 40,000 g/mol, such as no more than 35,000 g/mol. The thermoplastic material may have a weight average molecular weight of 10,000 to 1,000,000 g/mol, such as 15,000 to 500,000 g/mol, such as 15,000 to 100,000 g/mol, such as 15,000 to 50,000 g/mol, such as 15,000 to 40,000 g/mol, such as 15,000 to 35,000 g/mol, such as 20,000 to 1,000,000 g/mol, such as 20,000 to 500,000 g/mol, such as 20,000 to 100,000 g/mol, such as 20,000 to 50,000 g/mol, such as 20,000 to 40,000 g/mol, such as 20,000 to 35,000 g/mol, 25,000 to 1,000,000 g/mol, such as 25,000 to 500,000 g/mol, such as 25,000 to 100,000 g/mol, such as 25,000 to 50,000 g/mol, such as 25,000 to 40,000 g/mol, such as 25,000 to 35,000 g/mol, 30,000 to 1,000,000 g/mol, such as 30,000 to 500,000 g/mol, such as 30,000 to 100,000 g/mol, such as 30,000 to 50,000 g/mol, such as 30,000 to 40,000 g/mol, such as 30,000 to 35,000 g/mol, such as 32,000 g/mol.

The thermoplastic material may have a number average molecular weight of at least 5,000 g/mol, such as at least 8,000 g/mol, such as at least 9,000 g/mol. The thermoplastic material may have a number average molecular weight of no more than 100,000 g/mol, such as no more than 50,000 g/mol, such as no more than 25,000 g/mol, such as no more than 15,000 g/mol, such as no more than 10,000 g/mol. The thermoplastic material may have a number average molecular weight of 5,000 to 100,000 g/mol, 5,000 to 50,000 g/mol, 5,000 to 25,000 g/mol, 5,000 to 15,000 g/mol, 5,000 to 10,000 g/mol, such as 8,000 to 100,000 g/mol, 8,000 to 50,000 g/mol, such as 8,000 to 25,000 g/mol, such as 8,000 to 15,000 g/mol, such as 8,000 to 10,000 g/mol, such as 9,000 to 100,000 g/mol, 9,000 to 50,000 g/mol, such as 9,000 to 25,000 g/mol, such as 9,000 to 15,000 g/mol, such as 9,000 to 10,000 g/mol, such as 9,500 g/mol.

Weight average molecular weight ($M_w$) and number average molecular weight ($M_n$) may be measured by gel permeation chromatography using a polystyrene standard according to ASTM D6579-11. The gel permeation chromatography relative to linear polystyrene standards of 800 to 900,000 Da may be performed using a Waters 2695 separation module with a Waters 2414 differential refractometer (RI detector), tetrahydrofuran (THF) as the eluent at a flow rate of 1 ml/min, and with two PLgel Mixed-C (300×7.5 mm) columns for separation performed at room temperature.

The thermoplastic material may optionally comprise functional groups. For example, the thermoplastic material may comprise hydroxyl functional groups. A thermoplastic material comprising hydroxyl functional groups may have a hydroxyl equivalent weight of at least 200 g/equivalent, such as at least 240 g/equivalent, such as at least 250 g/equivalent, such as at least 260 g/equivalent, such as at least 270 g/equivalent. A thermoplastic material comprising hydroxyl functional groups may have a hydroxyl equivalent weight of no more than 500,000 g/equivalent, such as no more than 250,000 g/equivalent, such as no more than 100,000 g/equivalent, such as no more than 50,000 g/equivalent, such as no more than 25,000 g/equivalent, such as no more than 10,000 g/equivalent, such as no more than 1,000 g/equivalent, such as no more than 500 g/equivalent, such as no more than 350 g/equivalent, such as no more than 300 g/equivalent, such as no more than 285 g/equivalent. A thermoplastic material comprising hydroxyl functional groups may have a hydroxyl equivalent weight of such as 200 to 500,000 g/equivalent, such as 200 to 250,000 g/equivalent, such as 200 to 100,000 g/equivalent, such as 200 to 50,000 g/equivalent, such as 200 to 25,000 g/equivalent, such as 200 to 10,000 g/equivalent, such as 200 to 1,000 g/equivalent, such as 200 to 500 g/equivalent, such as 200 to 350 g/equivalent, such as 240 to 350 g/equivalent, such as 250 to 350 g/equivalent, such as 260 to 300 g/equivalent, such as 260 to 300 g/equivalent, such as 200 to 300 g/equivalent, such as 240 to 300 g/equivalent, such as 250 to 300 g/equivalent, such as 260 to 300 g/equivalent, such as 260 to 300 g/equivalent, such as 200 to 285 g/equivalent, such as 240 to 285 g/equivalent, such as 250 to 285 g/equivalent, such as 260 to 285 g/equivalent, such as 260 to 285 g/equivalent, such as 277 g/equivalent.

The thermoplastic material may be present in the powder coating composition, if at all, in an amount of at least 0.5% by weight, such as at least 1% by weight, such as at least 3% by weight, such as at least 6% by weight, such as at least 7% by weight, based on the total weight of the powder coating composition. The thermoplastic material may be present in the powder coating composition, if at all, in an amount of no more than 20%, such as no more than 10% by weight, such as no more than 9% by weight, such as no more than 8.5% by weight, based on the total weight of the powder coating composition. The thermoplastic material may be present in an amount of 0.5% to 20% by weight, such as 0.5% to 10% by weight, such as 0.5% to 9% by weight, such as 0.5% to 8.5% by weight, such as 1% to 20% by weight, such as 1% to 10% by weight, such as 1% to 9% by weight, such as 1% to 8.5% by weight, such as 3% to 20% by weight, such as 3% to 10% by weight, such as 3% to 9% by weight, such as 3% to 8.5% by weight, such as 6% to 20% by weight, such as 6% to 10% by weight, such as 6% to 9% by weight, such as 6% to 8.5% by weight, such as 7% to 20% by weight, such as 7% to 10% by weight, such as 7% to 9% by weight, such as 7% to 8.5% by weight, based on the total weight of the powder coating composition.

The thermoplastic material may be present in the powder coating composition, if at all, in an amount of at least 1% by volume, such as at least 4% by volume, such as at least 7% by volume, based on the total volume of the powder coating composition. The thermoplastic material may be present in the powder coating composition, if at all, in an amount of no more than 30% by volume, such as no more than 15% by volume, such as no more than 8% by volume, based on the total volume of the powder coating composition. The thermoplastic material may be present in an amount of 1% to 30% by volume, such as 4% to 15% by volume, such as 6% to 10% by volume, based on the total volume of the powder coating composition.

The powder coating composition may optionally further comprise a thermally conductive, electrically conductive filler. As used herein, the term "thermally conductive, electrically conductive filler" or "TC/EC filler" means a pigment, filler, or inorganic powder that has a thermal conductivity of at least 5 W/m·K at 25° C. (measured according to ASTM D7984) and a volume resistivity of less than 10 Ω·m (measured according to ASTM D257, C611, or B193). For example, the TC/EC filler material may have a thermal conductivity of at least 5 W/m·K at 25° C. (measured according to ASTM D7984), such as at least 18 W/m·K, such as at least 55 W/m·K. The TC/EC filler material may have a thermal conductivity of no more than 3,000 W/m·K at 25° C. (measured according to ASTM D7984), such as no more than 1,400 W/m·K, such as no more than 450 W/m·K. The TC/EC filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K. For example, the TC/EC filler material may have a volume resistivity of less than 10 Ω·m (measured according to ASTM D257, C611, or B193), such as less than 5 Ω·m, such as less than 1 Ω·m.

Suitable TC/EC filler materials include metals such as silver, zinc, copper, gold, or metal coated hollow particles. carbon compounds such as, graphite (such as Timrex commercially available from Imerys or ThermoCarb commercially available from Asbury Carbons), carbon black (for example, commercially available as Vulcan from Cabot Corporation), carbon fibers (for example, commercially available as milled carbon fiber from Zoltek), graphene and graphenic carbon particles (for example, xGnP graphene nanoplatelets commercially available from XG Sciences, and/or for example, the graphene particles described below), carbonyl iron, copper (such as spheroidal powder commercially available from Sigma Aldrich), zinc (such as Ultrapure commercially available from Purity Zinc Metals and Zinc Dust XL and XLP available from US Zinc), and the like.

Examples of "graphenic carbon particles" include carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

The TC/EC filler material may have any particle shape or geometry. For example, the TC/EC filler material may be a regular or irregular shape and may be spherical, ellipsoidal, cubical, platy, acicular (elongated or fibrous), rod-shaped, disk-shaped, prism-shaped, flake-shaped, rock-like, etc., agglomerates thereof, and any combination thereof.

Particles of the TC/EC filler material may have a reported average particle size in at least one dimension of at least 0.01 microns, as reported by the manufacturer, such as at least 2 microns, such as at least 10 microns. Particles of the TC/EC filler material may have a reported average particle size in at least one dimension of no more than 500 microns as reported by the manufacturer, such as no more than 300 microns, such as no more than 200 microns, such as no more than 150 microns. Particles of the TC/EC filler material may have a reported average particle size in at least one dimension of 0.01 microns to 500 microns as reported by the manufacturer, such as 0.1 microns to 300 microns, such as 2 microns to 200 microns, such as 10 microns to 150 microns. Suitable methods of measuring average particle size include measurement using an instrument such as the Quanta 250 FEG SEM or an equivalent instrument.

Particles of TC/EC filler material of the powder coating composition may have a reported Mohs hardness of at least 1 (based on the Mohs Hardness Scale), such as at least 2, such as at least 3. Particles of TC/EC filler material of the powder coating composition may have a reported Mohs hardness of no more than 10, such as no more than 8, such as no more than 7. Particles of TC/EI filler material of the powder coating composition may have a reported Mohs hardness of 1 to 10, such as 2 to 8, such as 3 to 7.

The TC/EC filler materials may be present in the powder coating composition, if at all, in an amount of at least 1% by weight, such as at least 2% by weight, such as at least 3% by weight, such as at least 4% by weight, based on the total weight of the powder coating composition. The TC/EC filler materials may be present in the powder coating composition, if at all, in an amount of no more than 35% by weight, such as no more than 20% by weight, such as no more than 10% by weight, such as no more than 8% by weight, based on the total weight of the powder coating composition. The TC/EC filler materials may be present in an amount of 1% to 35% by weight, such as 2% to 20% by weight, such as 3% to 10% by weight, such as 4% to 8% by weight, based on the total weight of the powder coating composition.

The TC/EC filler materials may be present in the powder coating composition, if at all, in an amount of at least 1% by volume, such as at least 5% by volume, such as at least 10% by volume, such as at least 20% by volume, based on the total volume of the powder coating composition. The TC/EC filler materials may be present in the powder coating composition, if at all, in an amount of no more than 30% by volume, such as no more than 25% by volume, such as no more than 20% by volume, such as no more than 15% by volume, based on the total volume of the powder coating composition. The TC/EC filler materials may be present in an amount of 1% to 30% by volume, such as 1% to 25% by volume, such as 5% to 20% by volume, such as 10% to 15% by volume, based on the total volume of the powder coating composition.

According to the present invention, the powder coating composition optionally may further comprise a dispersant. As used herein, the term "dispersant" refers to a substance that may be added to the composition in order to improve the separation of the filler particles by wetting the particles and breaking apart agglomerates. The dispersant, if present at all, may be present in the composition in an amount of at least 0.05% by volume, based on total volume of the filler, such as at least 0.2% by volume, and may be present in an amount of no more than 20% by volume, based on total volume of the filler, such as no more than 10% by volume, such as no more than 3% by volume, such as no more than 1% by volume. The dispersant, if present at all, may be present in the composition in an amount of 0.05% by volume to 20% by volume, based on total volume of the filler, such as 0.2% by volume to 10% by volume, such as 0.2% by volume to 3% by volume, such as 0.2% by volume to 1% by volume. As used herein, the filler refers to the non-binder additives included in the powder coating composition, such as the thermally conductive, electrically insulative filler material, the non-thermally conductive, electrically insulative filler material, the non-thermally conductive, electrically conductive filler material, and any other colorant or pigments included in the composition. Suitable dispersants for use in the composition include fatty acid, phosphoric acid esters, polyurethanes, polyamines, polyacrylates, polyalkoxylates, sulfonates, polyethers, and polyesters, or any combination thereof. Non-limiting examples of commercially available dispersants include ANTI-TERRA-U100, DISPERBYK-102, DISPERBYK-103, DISPERBYK-111, DISPERBYK-171, DISPERBYK-2151, DISPERBYK-2059, DISPERBYK-2000, DISPERBYK-2117, and DISPERBYK-2118 available from BYK Company; and SOLSPERSE 24000SC, SOLSPERSE 16000 and SOLSPERSE 8000 hyperdispersants available from The Lubrizol Corporation.

According to the present invention, the powder coating composition optionally may further comprise a core-shell polymer. Examples of the core-shell polymer include particles wherein a core composed of an elastomer polymer is covered with a shell layer composed of a glassy polymer, particles wherein a core composed of a glassy polymer is covered with a shell layer composed of an elastomer polymer, and particles having three-layer structures wherein the two-layer structures above are covered with a third outermost layer. Where necessary, the shell layer or the outermost layer may be modified so that functional groups such as carboxyl group, epoxy group and hydroxyl group will be introduced therein to provide compatibility and reactivity with the thermosetting resin. Examples of the cores include polybutadienes, acrylic polymers and polyisoprenes. Examples of the shell layers include alkyl (meth)acrylate copolymers, alkyl (meth)acrylate-styrene copolymers and alkyl (meth)acrylate copolymers. In examples, the core may be composed of a rubber polymer with a glass transition temperature of not more than room temperature such as polybutadiene, and a shell layer is composed of an alkyl (meth)acrylate polymer or copolymer with a glass transition temperature of not less than 60° C.

Examples of the core-shell polymer includes STAPHYLOID IM-101, STAPHYLOID IM-203, STAPHYLOID IM-301, STAPHYLOID IM-401, STAPHYLOID IM-601, STAPHYLOID AC3355, STAPHYLOID AC3816, STAPHYLOID AC3832, STAPHYLOID AC4030, STAPHYLOID AC3364 (manufactured by GANZ CHEMICAL CO., LTD.), KUREHA BTA751, KUREHA BTA731, KUREHA PARALOID EXL2314, KUREHA PARALOID EXL2655 (manufactured by KUREHA CORPORATION), Albidur 2240, Albidur 5340, Albidur 5640 (manufactured by Hanse Chemie), PARALOID EXL2655, PARALOID EXL2605, PARALOID EXL2602, PARALOID EXL2311, PARALOID EXL2313, PARALOID EXL2314, PARALOID EXL2315, PARALOID BTA705, PARALOID BTA712, PARALOID BTA731, PARALOID BTA751, PARALOID KM357P, PARALOID KM336P, PARALOID HIA80 and PARALOID HIA28S (manufactured by Rohm and Hass Company).

The core-shell polymer may have a spherical or substantially spherical shape. As used herein, the words "substantially spherical" mean that the longer diameter/shorter diameter ratio in an arbitrary elliptical cross section is from 1 to 10. The core-shell polymer may have an average particle diameter of 0.01 to 10 μm, such as 0.1 to 5 μm. In the invention, the average particle diameter indicates a biaxial average particle diameter represented by (longer axis+shorter axis)/2. The average particle diameter may be determined by laser diffraction particle size distribution analysis.

The core-shell polymer may be present in the powder coating composition, if at all, in an amount of at least 1% by weight, such as at least 2% by weight, such as at least 3% by weight, such as at least 4% by weight, based on the total weight of the powder coating composition. The core-shell polymer may be present in the powder coating composition, if at all, in an amount of no more than 35% by weight, such as no more than 20% by weight, such as no more than 10% by weight, such as no more than 8% by weight, based on the total weight of the powder coating composition. The core-shell polymer may be present in an amount of 1% to 35% by weight, such as 1% to 20% by weight, such as 1% to 10% by weight, such as 1% to 8% by weight, such as 2% to 35% by weight, such as 2% to 20% by weight, such as 2% to 10% by weight, such as 2% to 8% by weight, such as 3% to 35% by weight, such as 3% to 20% by weight, such as 3% to 10% by weight, such as 3% to 8% by weight, such as 4% to 35% by weight, such as 4% to 20% by weight, such as 4% to 10% by weight, such as 4% to 8% by weight, based on the total weight of the powder coating composition.

The core-shell polymer may be present in the powder coating composition, if at all, in an amount of at least 1% by volume, such as at least 5% by volume, such as at least 10% by volume, such as at least 20% by volume, based on the total volume of the powder coating composition. The core-shell polymer may be present in the powder coating composition, if at all, in an amount of no more than 30% by volume, such as no more than 25% by volume, such as no more than 20% by volume, such as no more than 15% by volume, based on the total volume of the powder coating composition. The core-shell polymer may be present in an amount of 1% to 30% by volume, such as 1% to 25% by volume, such as 5% to 20% by volume, such as 10% to 15% by volume, based on the total volume of the powder coating composition.

The powder coating composition of the present invention may comprise, consist essentially of, or consist of a binder comprising, consisting essentially of, or consisting of an epoxy resin; a core/shell polymer; and a thermally conductive, electrically insulative filler material. The thermally conductive, electrically insulative filler material may comprise, consist essentially of, or consist of boron nitride, silicon nitride, aluminum nitride, boron arsenide, aluminum oxide, magnesium oxide, dead burned magnesium oxide, beryllium oxide, silicon dioxide, titanium oxide, zinc oxide, nickel oxide, copper oxide, tin oxide, aluminum hydroxide (i.e., aluminum trihydrate), magnesium hydroxide, boron arsenide, silicon carbide, agate, emery, ceramic microspheres, diamond, or any combination thereof. The thermally conductive, electrically insulative filler material may comprise, consist essentially of, or consist of aluminum hydroxide and/or boron nitride.

The powder coating composition can also include other optional materials. For example, the powder coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings for example by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), and any mixture thereof.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Further, the powder coating composition may be substantially free, essentially free, or completely free of a colorant such as a pigment. The term "substantially free of a colorant" means that the coating composition contains less than 1000 parts per million by weight (ppm) of a colorant based on the total solids weight of the composition, "essentially free of a colorant" means that the coating composition contains less than 100 ppm of a colorant based on the total solids weight of the composition, and "completely free of a colorant" means that the coating composition contains less than 20 parts per billion by weight (ppb) of a colorant based on the total solids weight of the composition.

Other non-limiting examples of components that can be used with the powder coating compositions of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, corrosion-inhibitors, and other customary auxiliaries. The powder coating compositions can also be substantially free, essentially free, or completely free of any one of the previously described additional components.

The powder coating composition may comprise a composition having improved edge coverage. For example, surface tension effects can pull the coating away from the sharp edge(s) during flow/cure in some circumstances. Accordingly, a powder coating composition having improved edge coverage is a composition that reduces the flow of the coating during cure and maintains sufficient coating coverage over the edge. The powder coating composition may comprise a composition comprising film-forming resins and/or additives that improve edge coverage performance of the applied coating over the substrate. These materials have a lower tendency to flow and are able to effectively resist surface tension and remain in place.

The powder coating composition may be substantially free, essentially free, or completely free of silicone. As used herein, a powder coating composition is substantially free of silicone if silicone is present, if at all, in an amount of less than 5% by weight, based on the total weight of the powder coating composition. As used herein, a powder coating composition is essentially free of silicone if silicone is present, if at all, in an amount of less than 1% by weight, based on the total weight of the powder coating composition.

The powder coating composition may be substantially free, essentially free, or completely free of bentonite. As used herein, a powder coating composition is substantially free of bentonite if bentonite is present, if at all, in an amount of less than 0.5% by weight, based on the total weight of the powder coating composition. As used herein, a powder coating composition is essentially free of bentonite if bentonite is present, if at all, in an amount of less than 0.1% by weight, based on the total weight of the powder coating composition.

The powder coating composition may be substantially free, essentially free, or completely free of titanium dioxide. As used herein, a powder coating composition is substantially free of titanium dioxide if titanium dioxide is present, if at all, in an amount of less than 1% by weight, based on the total weight of the powder coating composition. As used herein, a powder coating composition is essentially free of titanium dioxide if titanium dioxide is present, if at all, in an amount of less than 0.1% by weight, based on the total weight of the powder coating composition.

The powder coating composition may be substantially free, essentially free, or completely free of polyol having a melting point of 40 to 110° C. Examples include a polyether polyol, a polyester polyol, a polycarbonate polyol, an acryl polyol, a polycaprolactone polyol, a linear polyol, and a polysiloxane polyol, all of which have a melting point of 40 to 110° C. As used herein, a powder coating composition is substantially free of polyol having a melting point of 40 to 110° C. if polyol having a melting point of 40 to 110° C. is present, if at all, in an amount of less than 5% by weight, based on the total weight of the powder coating composition. As used herein, a powder coating composition is essentially free of polyol having a melting point of 40 to 110° C. if polyol having a melting point of 40 to 110° C. is present, if at all, in an amount of less than 1% by weight, based on the total weight of the powder coating composition.

The powder coating composition may be prepared by mixing the previously described binder, thermally conductive, electrically insulative filler material, and optional additional components. The components are mixed such that a homogenous mixture is formed. The components can be mixed using art-recognized techniques and equipment such as with a Prism high speed mixer for example. When a solid coating composition is formed, the homogenous mixture is next melted and further mixed. The mixture can be melted with a twin screw extruder, single screw extruder, or a similar apparatus known in the art. During the melting process, the temperatures will be chosen to melt mix the solid homogenous mixture without curing the mixture. The homogenous mixture can be melt mixed in a twin screw extruder with zones set to a temperature of 75° C. to 140° C., such as 75° C. to 125° C., such as from 85° C. to 115° C. or at 100° C.

After melt mixing, the mixture may be cooled and re-solidified. The re-solidified mixture may then be ground such as in a milling process to form a solid particulate curable powder coating composition. The re-solidified mixture can be ground to any desired particle size. For example, in an electrostatic coating application, the re-solidified mixture can be ground to an average particle size of at least 10 microns or at least 20 microns and up to 130 microns as determined with a Beckman-Coulter LS™ 13 320 Laser Diffraction Particle Size Analyzer following the instructions described in the Beckman-Coulter LS™ 13 320 manual. Further, the particle size range of the total amount of particles in a sample used to determine the average particle size can comprise a range of from 1 micron to 200 microns, or from 5 microns to 180 microns, or from 10 microns to 150 microns, which is also determined with a Beckman-Coulter LS™ 13 320 Laser Diffraction Particle Size Analyzer following the instructions described in the Beckman-Coulter LS™ 13 320 manual.

The powder coating compositions of the present invention can be applied by any means standard in the art, such as spraying, electrostatic spraying, a fluidized bed process, and the like. After the powder coating compositions are applied to a substrate, the compositions can be cured or at least partially cured such as with heat, or with other means such as actinic radiation to form an at least partially cured coating.

In some examples, the powder coating composition of the present invention is cured with heat, such convection heating within a range of from 250° F. to 500° F. for 2 to 40 minutes, or within a range of from 250° F. to 400° F. for 10 to 30 minutes, or within a range of from 300° F. to 400° F. for 10 to 30 minutes. The powder coating composition of the present invention can also be cured with infrared radiation in which peak metal temperatures can reach 400° F. to 500° F. in about 10 seconds. The elevated heat ramping with infrared radiation allows for fast cure times. In some examples, the powder coating composition of the present invention is cured with infrared radiation to heat the composition within a range of from 300° F. to 550° F. for 1 to 20 minutes, or within a range of from 350° F. to 525° F. for 2 to 10 minutes, or within a range of from 370° F. to 515° F. for 5 to 8 minutes.

It is appreciated that the powder coating composition of the present invention can be cured with multiple types of heat sources such as both convection heating and infrared radiation. For example, the powder coating composition of the present invention can be partially cured with convection heating or infrared radiation, and then completely cured with a different heat source chosen from convection heating and infrared radiation.

The powder coating compositions of the present invention can also be applied in multiple applications over a substrate. For instance, after the substrate has been coated with a coating deposited from an electrodepositable coating composition, a first powder coating composition according to the present invention can be applied over at least a portion of a substrate. A second powder coating composition according to the present invention can be applied over at least a portion of the first coating composition. The first powder coating composition can optionally be cured or at least partially cured before applying the second powder coating composition. Alternatively, the second powder coating composition can be applied over at least a portion of the first coating composition. The first and second coating composition can then be cured together at the same time. The powder coating compositions can be cured with any of the methods previously described.

Coatings formed from a single powder coating composition according to the present invention can be applied at any desired dry film thickness. For example, the dry film thickness may be at least 2 mils (50.8 microns), such as at least 3 mils (76.2 microns), such as at least 4 mils (101.6 microns), such as at least 5 mils (127 microns), such as at least 6 mils (152.4 microns), such as at least 8 mils (203.2 microns), such as at least 10 mils (254 microns), such as at least 12 mils (304.8 microns), such as at least 20 mils (508 microns), such as at least 40 mils (1,016 microns). For example, the dry film thickness may be less than 40 mils (1,016 microns), such as less than 20 mils (508 microns), such as less than 12 mils (304.8 microns), less than 10 mils (254 microns), less than 8 mils (203.2 microns), or less than 6 mils (152.4 microns), or less 5 mils (127 microns), or less than 4 mils (101.6 microns), or less than 3 mils (76.2 microns), or less than 2 mils (50.8 microns). It is appreciated that, when multiple powder coating compositions are applied, each composition can be applied to separately provide any of the previously described dry film thicknesses. For instance, when two separate powder coating compositions of the present invention are applied, each individual powder coating composition can be applied at any of the previously described dry film thicknesses.

The present invention is also directed to a method of coating a substrate comprising electrodepositing an electrodepositable coating layer deposited from an electrodepositable coating composition onto a surface of the substrate and applying a powder coating layer on to at least a portion of the electrodepositable coating layer. The substrate may comprise, for example, a battery or battery component.

The present invention is also directed to a method of coating a substrate comprising electrodepositing an electrodepositable coating layer deposited from an electrodepositable coating composition onto a surface of the substrate and applying a powder coating layer comprising a binder and an electrically insulative filler on to at least a portion of the electrodepositable coating layer. The substrate may comprise, for example, a battery or battery component.

According to the present invention, the method may comprise (a) electrophoretically depositing onto at least a portion of the substrate a coating deposited from an electrodepositable coating composition of the present invention and (b) heating the coated substrate to a temperature and for a time sufficient to cure the electrodeposited coating on the substrate. The method may further comprise (c) applying directly to the at least partially cured electrodeposited coating one or more powder coating compositions to form a powder coating layer over at least a portion of the at least partially cured electrodeposited coating layer, and (d) heating the coated substrate of step (c) to a temperature and for a time sufficient to cure the top coat.

The electrodepositable coating layer and powder coating layer are utilized in an a multi-layer coating composite comprising a substrate with various coating layers. The coating layers may optionally include a pretreatment layer, such as a phosphate layer (e.g., zinc phosphate layer) or zirconium oxide layer, the electrodepositable coating layer, the powder coating layer, and other optional layers (e.g., base coat, clear coat layer, pigmented monocoat, and color-plus-clear composite compositions). It is understood that optional layers include any of those known in the art, and each independently may be waterborne, solventborne, a powder coating composition, or in the form of a powder slurry. The optional layers typically include a film-forming polymer, crosslinking material and, if a colored base coat or monocoat, one or more pigments. According to the present invention, one or more of the coating layers may be applied onto a substantially uncured underlying layer, and multiple layers may be simultaneously cured in a downstream process.

It will also be understood that the powder coating layer(s) may be applied onto an underlying layer despite the fact that the underlying layer has not been fully cured. For example, a powder coating layer may be applied onto the electrodepositable coating layer or a basecoat layer even though the underlying layer(s) have not been subjected to a curing step. The layers may then be cured during a subsequent curing step thereby eliminating the need to cure the layers separately.

The present invention is also directed to a substrate comprising an electrodepositable coating layer and a powder coating layer on at least a portion of the electrodepositable coating layer. The electrodepositable coating layer may be deposited from the electrodepositable coating composition described herein. The powder coating layer may be deposited from the powder coating composition described herein.

The electrodepositable coating layer and a powder coating layer on at least a portion of the electrodepositable coating layer may form a multi-layer dielectric coating (i.e., an electrically insulating coating). For example, the multi-layer dielectric coating may have a dielectric strength of at least 1 kV at any of the combined dry film thicknesses described herein, as measured by a Sefelec Dielectrimeter RMG12AC-DC and in accordance ASTM D 149-09 Hipot test, such as at least 2 kV, such as at least 2.5 kV, such as at least 5 kV, such as at least 7 kV, such as at least 8 kV, such as at least 10 kV, such as at least 12 kV, or higher. For example, the multi-layer dielectric coating may have a dielectric strength of at least 1 kV at a total combined dry film thickness of 250 microns or less, as measured by a Sefelec Dielectrimeter RMG12AC-DC and in accordance ASTM D 149-09 Hipot test, such as at least 2 kV, such as at least 2.5 kV, such as at least 5 kV, such as at least 7 kV, such as at least 8 kV, such as at least 10 kV, such as at least 12 kV, or higher.

The multi-layer coating optionally may be thermally conductive. For example, the multi-layer coating may have a thermal conductivity of at least 0.3 W/m·K, as measured according to ASTM D7984, such as at least 0.5 W/m·K, such as at least 0.7 W/m·K, such as at least 0.9 W/m·K, such as at least 1.5 W/m·K, or higher.

The substrate may be selected from a wide variety of substrates and combinations thereof. Non-limiting examples of substrates include vehicles including automotive substrates, industrial substrates, marine substrates and components such as ships, vessels, and on-shore and off-shore installations, storage tanks, packaging substrates, architectural substrates, aerocraft and aerospace components, batteries and battery components, bus bars, metal wires, copper or aluminum conductors, nickel conductors, wood flooring and furniture, fasteners, coiled metals, heat exchangers, vents, an extrusion, roofing, wheels, grates, belts, conveyors, grain or seed silos, wire mesh, bolts or nuts, a screen or grid, HVAC equipment, frames, tanks, cords, wires, apparel, electronics and electronic components including housings and circuit boards, glass, sports equipment, including golf balls, stadiums, buildings, bridges, containers such as a food and beverage containers, and the like.

The substrates, including any of the substrates previously described, can be metallic or non-metallic. Metallic substrates include, but are not limited to, tin, steel, cold rolled steel, hot rolled steel, steel coated with zinc metal, zinc compounds, zinc alloys, electrogalvanized steel, hot-dipped galvanized steel, galvanealed steel, galvalume, steel plated with zinc alloy, stainless steel, zinc-aluminum-magnesium alloy coated steel, zinc-aluminum alloys, aluminum, aluminum alloys, aluminum plated steel, aluminum alloy plated steel, steel coated with a zinc-aluminum alloy, magnesium, magnesium alloys, nickel, nickel plating, bronze, tinplate, clad, titanium, brass, copper, silver, gold, 3-D printed metals, cast or forged metals and alloys, or combinations thereof.

The coating compositions of the present invention may be applied onto a number of substrates. Accordingly, the present invention is further directed to a substrate that is coated, at least in part, with the electrodepositable coating composition described herein. It will be understood that the electrocoating coating composition can be applied onto a substrate as a monocoat or as a coating layer in a multi-layer coating composite. The electrodepositable coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 3XXX, 4XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091

Non-metallic substrates may also be used if they are conductive and include composite substrates such as carbon fiber composites, and the like.

As used herein, "vehicle" or variations thereof include, but are not limited to, civilian, commercial and military aircraft, and/or land vehicles such as airplanes, helicopters, cars, motorcycles, and/or trucks. The shape of the substrate can be in the form of a sheet, plate, bar, rod or any shape desired.

The substrate can undergo various treatments prior to application of the electrodepositable coating composition and/or powder coating composition. For instance, the substrate can be alkaline cleaned, deoxidized, mechanically cleaned, ultrasonically cleaned, solvent wiped, roughened, plasma cleaned or etched, exposed to chemical vapor deposition, treated with an adhesion promoter, plated, anodized, annealed, cladded, or any combination thereof prior to application of the powder coating composition. The substrate can be treated using any of the previously described methods prior to application of the electrodepositable coating composition and/or powder coating composition such as by dipping the substrate in a cleaner and/or deoxidizer bath prior to applying the electrodepositable coating composition and/or powder coating composition. The substrate can also be plated prior to applying the electrodepositable coating composition and/or powder coating composition. As used herein, "plating" refers to depositing a metal over a surface of the substrate. The substrate may be also be 3D printed.

As discussed above, the substrate may comprise a battery or battery component. The battery may be, for example, an electric vehicle battery, and the battery component may be an electric vehicle battery component. The battery component may comprise, but is not limited thereto, a battery cell, a battery shell, a battery module, a battery pack, a battery box, a battery cell casing, a pack shell, a battery lid and tray, a thermal management system, an inverter, a battery housing, a module housing, a module racking, a battery side plate, a battery cell enclosure, a cooling module, a cooling tube, a cooling fin, a cooling plate, a bus bar, a battery frame, an electrical connection, metal wires, copper or aluminum conductors or cables, any part of a stationary energy storage system, or any combination thereof. The electrodepositable coating composition and powder coating composition may be applied over any of these substrates to form an electrically insulating coating (i.e., dielectric coating), a thermally conductive coating, or an electrically insulating and thermally conductive coating, as described herein.

The coated substrate may comprise a battery component comprising an electrodepositable coating layer and a powder coating layer comprising, consisting essentially of, or consisting of a binder and an electrically insulating filler material.

The coated substrate may comprise a battery component comprising an electrodepositable coating layer and a powder coating layer comprising, consisting essentially of, or consisting of a binder and a thermally conductive, electrically insulating filler material. The thermally conductive, electrically insulating filler material may comprise, consist essentially of, or consist of aluminum hydroxide. For example, the coated substrate may comprise a battery component comprising an electrodepositable coating layer and a powder coating layer comprising, consisting essentially of, or consisting of a binder and aluminum hydroxide present in an amount of at least 20% by weight, such as at least 40% by weight, such as at least 45% by weight, such as at least 50% by weight, based on the total weight of the thermally conductive, electrically insulating coating.

The coated substrate may comprise a battery component comprising an electrodepositable coating layer and a powder coating layer comprising, consisting essentially of, or consisting of a binder and a thermally conductive, electrically insulating filler material comprising, consisting essentially of, or consisting of dead burned magnesium oxide.

The coated substrate may comprise a battery component an electrodepositable coating layer and a powder coating layer comprising, consisting essentially of, or consisting of a binder, a thermoplastic material, and a thermally conductive, electrically insulating filler material.

The coated substrate may comprise a battery component comprising a thermally conductive, electrically insulating coating comprising, consisting essentially of, or consisting of a binder, and at least two thermally conductive, electrically insulating filler material. The at least two thermally conductive, electrically insulating filler material may comprise, consist essentially of, or consist of at least two of aluminum hydroxide, dead burned magnesium oxide, and boron nitride. The binder may comprise, consist essentially of, or consist of an epoxy resin and/or a polyester resin.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" or "Tg" is the temperature at which a glass transition occurs, i.e., a reversible transition from hard and relatively brittle glassy state into a viscous or rubbery state. The glass transition temperature may be a measured or theoretical value. For example, the theoretical glass transition temperature of (meth)acrylic polymers may be calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term substantially free means that the component is present, if at all, in an amount of less than 5% by weight, based on the total weight of the powder coating composition.

As used herein, unless otherwise defined, the term essentially free means that the component is present, if at all, in an amount of less than 1% by weight, based on the total weight of the powder coating composition.

As used herein, unless otherwise defined, the term completely free means that the component is not present in the powder coating composition, i.e., 0.00% by weight, based on the total weight of the powder coating composition.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" thermoplastic material, "a" thermally conductive, electrically insulative filler material, "a" non-thermally conductive, electrically insulative filler material, "an" electrically conductive filler material, and "a" dispersant, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a powder coating composition "deposited onto" a substrate does not preclude the presence of one or more other intervening coating layers of the same or different composition located between the powder coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Illustrating the invention are the following examples, which, however, are not to be considered as limiting the invention to their details. Unless otherwise indicated, all parts and percentages in the following examples, as well as throughout the specification, are by weight.

EXAMPLES

Example 1: Powder Coating Composition

Curable film-forming powder coating composition of Example 1 was prepared from the components listed in TABLE 1 below:

TABLE 1

| Ingredient | Ex 1 |
|---|---|
| Crylcoat 2409 | 91.4 |
| Triglycidyl isocyanurate | 6.9 |
| Powdermate 570FL | 1.5 |
| Aerosil 200 | 0.2 |
| Aerox Alu C alumina | 0.2 |

Each of the components listed in Table 1 for Example 1 were weighed in a container and mixed in a Henschel high speed mixer for at least 30 seconds at 1500 RPM to form a dry homogeneous mixture. The mixture was then melt mixed in a Werner & Pfleiderer 30 mm twin screw extruder with a speed of 350-450 RPM. The extruder zones were set at 90 to 115° F. The feed rate was such that a torque of 20-40% was observed on the equipment. The mixtures were dropped onto a set of chill rolls to cool and re-solidify the mixtures into solid chips. The chips were milled in a Bantam Mill to obtain a particle size of predominantly 5 to 100 microns with a majority of the particles being from 20 to 60 microns by volume. The resulting coating composition of Example 1 was a solid particulate powder coating composition that was free flowing.

The solid particulate powder coating composition of Example 1 was electrostatically sprayed with a Nordson manual spray gun at voltage of 45 kV to 90 kV with a vibratory feed dispenser with 20 psi flow air onto aluminum substrates. During application, a layer of 1.6 to 4.0 mils was applied and then cured in a conventional oven at 375° F. for 20 minutes.

The coating prepared from the composition of Example 1 was evaluated for dielectric strength, as measured by a Sefelec Dielectric Strength Tester RMG12AC-DC and in accordance with ASTM D149-09 Dielectric Breakdown Voltage and Dielectric Strength test. The parameters of the testing were as follows: Voltage limit 12.0 kV DC, $I_{max}$ Limit: 0.5 mA, 20 second ramp, 20 second dwell, and 2 second fall. The results of the dielectric strength test are reported in Table 2 below.

TABLE 2

| | Ex. 1 |
|---|---|
| Film Thickness Average (mils) | 3.3 |
| Dielectric Breakdown (Kv) | 6.0 |

Examples 2-3: Electrodepositable Coating Compositions

Curable film-forming electrodepositable coating compositions of Examples 2-3 were prepared from the components listed in Table 3 below.

TABLE 3

| Ingredient | Example 2 | Example 3 |
|---|---|---|
| CR691B[1] | 46.7 | — |
| CR681[2] | — | 46.7 |
| Deionized water | 46.4 | 46.4 |

[1] Electrodepositable aqueous resin blend commercially available from PPG Industries
[2] Electrodepositable aqueous resin blend commercially available from PPG Industries The resin components listed in TABLE 3 for each of Examples 2-3 were weighed in a container and diluted with deionized water. The full bath was agitated with an air-powered motor for 30 minutes to form a homogeneous mixture of the electrodepositable coating composition. The mixture was filtered through and 355 mesh filter into a Nalgene container for coatings deposition if needed to reduce contamination. The electrodepositable coating composition bath was heated to 90° F. temperature using a U-shaped heating coil. A coating from the electrodepositable coating composition bath was then electrodeposited onto an aluminum panel using a 200-350 voltage application for 120 seconds, maintaining a 1 amp current with a rectifier. The electrodepositable coating composition bath was under constant mixing during electrodeposition with a magnetic stir plate.

During deposition, a layer of 1.0 to 1.3 mils was deposited onto the substrate and then cured with a conventional oven for 20 minutes at peak metal temperature.

Each of the coatings prepared from the compositions were evaluated for dielectric strength using the same procedure as described above. The results of the dielectric strength test are reported in TABLE 4 below.

TABLE 4

| | Ex. 2 | Ex. 3 |
|---|---|---|
| Film Thickness Average (mils) | 1.25 | 1.1 |
| Dielectric Breakdown (kV) | 3.3 | 1.7 |

Examples 4-6: Two-Layer Dielectric Coatings

Each of the electrodepositable coating compositions of Examples 2-3 were applied to substrates according the same procedure described above, and each was then topcoated with the powder coating composition of Examples 1 according to the same procedure as described above. The resulting two-layer coatings were then evaluated for dielectric strength according to the same procedure described above. The results are reported in Table 5 below with the results from Tables 3 and 4 also reproduced below for comparison.

TABLE S

| Single Layer Coatings | | | | |
|---|---|---|---|---|
| | Coating Layer | | Film Thickness Average (mils) | Dielectric Breakdown |
| Ex. 1 | — | Powder 1 | 3.3 | 6.0 |
| Ex. 2 | Electrocoat 1 | — | 1.25 | 3.3 |
| Ex. 3 | Electrocoat 2 | — | 1.1 | 1.7 |

TABLE S-continued

| Two-Layer Coatings | | | | |
|---|---|---|---|---|
| | Layer A | Layer B | Film Thickness Average (mils) | Dielectric Breakdown |
| Ex. 4 | Electrocoat 1 (Ex. 2) | Powder 1 (Ex. 1) | Ecoat: 1.25<br>Powder: 2.45<br>Total: 3.7 | >12 |
| Ex. 5 | Electrocoat 2 (Ex. 3) | Powder 1 (Ex. 1) | Ecoat: 1.1<br>Powder: 3.7<br>Total: 4.8 | >12 |

As shown in Table 5, the combination of the electrodepositable coating composition and powder coating compositions synergistically improved the dielectric strength of each of the two-layer coating systems relative to the electrodepositable coating layer or powder coating layer alone.

Examples 6-9: Powder Coating Compositions

Curable film-forming powder coating compositions of Examples 6-9 were prepared from the components listed in TABLE 6 below:

TABLE 6

| Ingredient | Example 6 | Example 7 | Example 8 | Example 9 |
|---|---|---|---|---|
| Epon 2004[1] | 17.58 | — | 28.22 | — |
| NPES-903[2] | 17.58 | — | 28.22 | 20.35 |
| Epikure P-202[3] | 7.388 | — | 11.86 | — |
| KD-211H[4] | — | 14.77 | — | — |
| KD404-J[5] | — | 16.67 | — | — |
| KD-213H[6] | — | 50.92 | — | — |
| Lunamer MB-68[7] | 0.2 | — | 0.2 | — |
| UralacP5142[8] | — | — | — | 21.71 |
| Joncryl 819[9] | — | — | — | 1.5 |
| Vestagon BF1540[10] | — | — | — | 3 |
| Butaflow BT-71[11] | — | — | — | 0.11 |
| Staphyloid AC-4030[12] | 5 | — | — | — |
| Apyral 20HC[13] | 50 | — | — | — |
| Apyyral 499 XLV[14] | — | — | — | 50 |
| Portafill A40[15] | — | — | 27.24 | — |
| Exbar W1[16] | — | 8.33 | — | — |
| Griltex D1874E[17] | — | — | 2 | — |
| BYK 111[18] | — | — | — | — |
| Phenoxy Dispersant[19] | — | — | — | 1.33 |
| Printex G[20] | 0.6 | — | 0.6 | — |
| 8100 EZ-T Yellow oxide[21] | — | 0.1 | — | — |
| Pigment Red 254[22] | — | 0.05 | — | — |
| Bayferrox 130 BM[23] | — | 0.99 | — | — |
| Bayferrox 105M[24] | — | 2.19 | — | — |
| SBS-1200[25] | — | 0.5 | — | — |
| Aalchem 76DF[26] | — | 0.3 | — | — |
| Aerosil R-972[27] | — | 2.99 | — | — |
| Resiflow P-67[28] | — | 1.19 | — | — |

TABLE 6-continued

| Ingredient | Example 6 | Example 7 | Example 8 | Example 9 |
|---|---|---|---|---|
| Resiflow PL-200A[29] | 1 | — | 1 | 0.7 |
| Benzoin[30] | 0.5 | 0.8 | 0.5 | 0.44 |
| Micromide 520L[31] | — | — | — | 0.75 |
| Aerox Alu C[32] | 0.15 | 0.15 | 0.15 | 0.1 |

[1]Commercially available epoxy resin from Hexion Specialty Chemicals
[2]Commercially available epoxy resin from Nan Ya
[3]Commercially available phenolic curative from Hexion Specialty Chemicals
[4]Commercially available novalac modified epoxy resin from Kukdo Chemical Co.
[5]Commercially available phenolic curative from Kukdo Chemical Co.
[6]Commercially available novalac modified epoxy resin from Kukdo Chemical Co.
[7]Commercially available salt of polycarboxylic acid with cyclic amidine form Aal Chem
[8]Commercially available carboxylated polyester resin from DSM
[9]Commercially available carboxyl functional acrylic resin from BASF
[10]Commercially available polyisocyanate adduct from Evonik Industries
[11]Commercially available dibutyltin dilaurate catalyst on silica from Estron Chemical
[12]Commercially available core-shell alkylmethacrylate copolymer from Takeda Chemical Industries
[13]Aluminum Trihydroxide available from Nabaltec AG
[14]Aluminum Trihydroxide available from Nabaltec AG
[15]Aluminum trihydroxide (ATH) having a D97 particle size of about 36 commercially available from Sib el co
[16]Commercially available barium sulfate from Excalibar minarals LLC
[17]Commercially available thermoplastic copolymer from EMS- Griltech
[18]Commercially available dispersing additive from BYK
[19]Commercially available PKHB-XLV epoxy blend dispersant from Gabriel Performance Products
[20] Commercially available carbon black pigment from Orion Engineered Carbons
[21]Commercially available yellow iron oxide pigment form Deqing Tongrui Coonstruction Co.
[22]Commercially available 1,4-bi s(4-chlorophenyl)-2,5-dihydropyrrolo[3,4-c]pyrrole-3,6-dione from Aakash Chemical & Dye-Stuffs Inc
[23]Commercially available red iron oxide from Lanxess Corporation
[24]Commercially available yellowish iron oxide red pigment from Lanxess Corporation
[25]Commercially available synthetic wax from Estron Chemical
[26]Commercially available antioxidant from Aal Chemial
[27]Commercially available hydrophobic fumed silica from Evonik Industries
[28]Commercially available leveling agent from Estron Chemical
[29]Commercially available flow control agent from Estron Chemical
[30]Commercially available degassing agent from Mitsubishi Chemical Corporation
[31]Commercially available finely micronized fatty amide wax from Micro Powders, Inc.
[32]Commercially available aluminum oxide from Evonik Industries Each of the components listed in Table 6 for each of Examples 6-9 were weighed in a container and mixed in a Henschel high speed mixer for at least 30 seconds at 1500 RPM to form a dry homogeneous mixture. The mixture was then melt mixed in a Werner & Pfleiderer 30 mm twin screw extruder with a speed of 350-450 RPM. The extruder zones were set at 90 to 115° F. The feed rate was such that a torque of 20-40% was observed on the equipment. The mixtures were dropped onto a set of chill rolls to cool and re-solidify the mixtures into solid chips. The chips were milled in a Bantam Mill to obtain a particle size of predominantly 5 to 100 microns with a majority of the particles being from 20 to 60 microns by volume. The resulting coating compositions for each of Examples 6-9 were solid particulate powder coating compositions that were free flowing.

Each of the solid particulate powder coating compositions of Examples 6-9 were electrostatically sprayed with a Nordson manual spray gun at voltage of 45 kV to 90 kV with a vibratory feed dispenser with 20 psi flow air onto aluminum substrates. During application, a layer of 1.6 to 4.0 mils was applied and then cured with a conventional oven at 375° F. for 20 minutes.

Each of the coatings prepared from the compositions of Examples 6-9 were evaluated for dielectric strength, as measured by a Sefelec Dielectric Strength Tester RMG12AC-DC and in accordance with ASTM D149-09 Dielectric Breakdown Voltage and Dielectric Strength test. The parameters of the testing were as follows: Voltage limit 12.0 kV DC, $I_{max}$ Limit: 0.5 mA, 20 second ramp, 20 second dwell, and 2 second fall. The results of the dielectric strength test are reported in Table 7 below. Additionally, the mechanical properties of the powder film was evaluated for conical mandrel bend according to ASTMD522, and pencil hardness according to ASTMD3363. These results are noted in Table 7 as well.

TABLE 7

| | Example 6 | Example 7 | Example 8 | Example 9 |
|---|---|---|---|---|
| Film Thickness Average (mils) | 3.2 | 3.8 | 4.1 | 3.8 |
| Dielectric Breakdown (kV) | 5.1 | 7.3 | 5.2 | 6.8 |
| Conical Mandrel Bend | No cracking | Average cracking = 9 mm | Average cracking = 1 mm | Average cracking = 13.6 mm |
| Pencil Hardness (Gouge) | >4 H | >4 H | >4 H | >4 H |

Examples: Electrodepositable Coating Compositions

Curable film-forming electrodepositable coating compositions were prepared from the components listed in Table 8 below.

TABLE 8

| | Electrodepositable Coating Compositions | | | | | |
|---|---|---|---|---|---|---|
| Ingredient | P6000CX clear | P6100HE clear | P590-534 | CR458A | P6000CX | EC 1000 with Lumiflon FD-1000 |
| CR691B[1] | 53.8 | — | — | — | 50.4 | — |
| CR681[2] | — | 53.8 | — | — | — | — |
| CF590-534[3] | — | — | 39.2 | — | — | — |
| CR458A[4] | — | — | — | 49.2 | — | — |
| CP524[5] | — | — | — | — | 6.4 | — |
| EC1000[6] | — | — | — | — | — | 4.9 |
| CP455[7] | — | — | — | 14.7 | — | — |
| Lumiflon FD-1000[8] | — | — | — | — | — | 17.5 |
| Tin Paste[9] | 1.2 | 1.2 | — | — | 1.1 | — |
| Cymel 1130[10] | — | — | — | — | — | 1.3 |
| Deionized water | 45 | 45 | 60.8 | 36.1 | 42.1 | 76.3 |

[1]Cationic epoxy resin blend commercially available from PPG
[2]Cationic epoxy resin blend commercially available from PPG
[3]Cationic epoxy feed commercially available from PPG
[4]Cationic epoxy resin blend commercially available from PPG
[5]Cationic pigment paste commercially available from PPG
[6]Anionic acrylic resin blend commercially available from PPG
[7]Cationic pigment paste commercially available from PPG
[8]Fluoropolymer commercially available from ACG Chemical Americas, Inc.
[9]Tin catalyst paste containing 36% by weight dibutyl tin oxide, based on total weight.
[10]Methaylated n-butylated melamine crosslinker commercially available from Allnex.

The resin components listed in TABLE 8 for each the compositions were weighed in a container and diluted with deionized water. The full bath was agitated with an air-powered motor for 30 minutes to form a homogeneous mixture of the electrodepositable coating composition. The mixture was filtered through and 355 mesh filter into a Nalgene container for coatings deposition if needed to reduce contamination. The electrodepositable coating composition bath was heated to 90° F. temperature using a U-shaped heating coil. A coating from the electrodepositable coating composition bath was then electrodeposited onto an aluminum panel using a 200-350 voltage application for 120 seconds, maintaining a 1 amp current with a rectifier. The electrodepositable coating composition bath was under constant mixing during electrodeposition with a magnetic stir plate.

During deposition, a layer of 1.0 to 1.5 mils was deposited onto the substrate and then cured with a conventional oven for 20 minutes at peak metal temperature.

Each of the coatings prepared from the compositions were evaluated for dielectric strength using the same procedure as described above. The results of the dielectric strength test are reported in TABLE 9 below.

TABLE 9

| | Electrodepositable Coating Compositions | | | | | |
|---|---|---|---|---|---|---|
| | P6000CX clear | P6100 HE clear | P590-534 | CR458A | P6000CX | EC 1000 with Lumiflon FD-1000 |
| Film Thickness (mils) | 1.3 | 1.2 | 1.4 | 1.3 | 1.5 | 1.3 |
| Dielectric Breakdown (kV) | 6.2 | 1.7 | 2.4 | 0.6 | 2.5 | 2.4 |

Examples 10-18: Two-Layer Dielectric Coatings

Each of the electrodepositable coating compositions were applied to substrates according the same procedure described above, and then each was then topcoated with one of the powder coating compositions of Examples 6-9 according to the same procedure as described above. The resulting two-layer coatings were then evaluated for dielectric strength according to the same procedure described above. The results are reported in Table 10 below with the results from Tables 7 and 9 also reproduced below for comparison.

TABLE 10

| Single Layer Coatings | | | | |
|---|---|---|---|---|
| | Coating Layer | | Film Thickness Average (mils) | Dielectric Breakdown (kV) |
| | P6000 CX clear | — | 1.3 | 6.2 |
| | P6100HE clear | — | 1.2 | 1.7 |
| | P590-534 | — | 1.4 | 2.4 |
| | CR458A | — | 1.3 | 0.6 |
| | P6000CX | — | 1.5 | 2.5 |
| | EC 1000 with LUMIFLON FD-1000 | | 1.3 | 2.4 |
| | — | Example 6 | 3.2 | 5.1 |
| | — | Example 7 | 3.8 | 7.3 |
| | — | Example 8 | 4.1 | 5.2 |
| | — | Example 9 | 3.8 | 6.8 |

| Two-Layer Coatings | | | | |
|---|---|---|---|---|
| | Layer A | Layer B | Film Thickness Per Layer and Total (mils) | Dielectric Breakdown |
| Ex. 10 | CR458A | Example 7 | Ecoat: 1.3<br>Powder: 2.5<br>Total: 3.8 | 10.8 |
| Ex. 11 | P6100HE clear | Example 8 | Ecoat: 1.2<br>Powder: 2.9<br>Total: 4.1 | 11.8 |
| Ex. 12 | EC 1000 with LUMIFLON FD-1000 | Example 9 | Ecoat: 1.3<br>Powder: 2.5<br>Total: 3.8 | >12 |
| Ex. 13 | CR458A | Example 9 | Ecoat: 1.3<br>Powder: 2.3<br>Total: 3.6 | 11.1 |
| Ex. 14 | P6100HE clear | Example 9 | Ecoat: 1.2<br>Powder: 2.7<br>Total: 3.9 | 11.5 |
| Ex. 15 | P590-534 | Example 9 | Ecoat: 1.4<br>Powder: 2.5<br>Total: 3.9 | 11.9 |

TABLE 10-continued

| | | | | |
|---|---|---|---|---|
| Ex. 16 | P6000CX clear | Example 9 | Ecoat: 1.3<br>Powder: 2.4<br>Total: 3.7 | >12 |
| Ex. 17 | P6000CX | Example 9 | Ecoat: 1.5<br>Powder: 2.7<br>Total: 4.2 | 10.1 |
| Ex. 18 | P590-534 | Example 6 | Ecoat: 1.4<br>Powder: 1.7<br>Total: 3.1 | 10.0 |

As shown in Table 10, the combination of the electrodepositable coating composition and powder coating compositions synergistically improved the dielectric strength of each of the two-layer coating systems relative to the electrodepositable coating layer or powder coating layer alone.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A coated substrate comprising a first coating layer comprising:

an electrodepositable coating layer deposited from an electrodepositable coating composition, and a second coating layer comprising a powder coating layer on at least a portion of the first coating layer, wherein the powder coating layer is formed from a powder coating composition, and wherein the first coating layer and second coating layer form a multi-layer dielectric coating having a dielectric strength of at least 1 kV, as measured by a Sefelec Dielectrimeter RMG12AC-DC and in accordance with ASTM D 149-09 Hipot test; and wherein the substrate comprises a battery or a battery component, wherein the battery component comprises a battery cell, a battery shell, a battery module, a battery pack, a battery box, a battery cell casing, a pack shell, a battery lid and tray, a thermal management system, an inverter, a battery housing, a module house, a module racking, a battery side plate, a battery cell enclosure, a cooling module, a cooling tube, a cooling fin, a cooling plate, a bus bar, a battery frame, and/or a stationary energy storage system.

2. The coated substrate of claim 1, wherein the powder coating composition comprises a binder comprising a film-forming resin comprising an epoxy resin.

3. The coated substrate of claim 1, wherein the powder coating composition comprises a binder comprising a film-forming resin comprising an epoxy resin and a polyester resin.

4. The coated substrate of claim 1, wherein the powder coating composition comprises a binder comprising a crosslinker, and wherein the crosslinker comprises a phenolic resin, an amino resin, an epoxy resin, a triglycidyl isocyanurate, a beta-hydroxy (alkyl)amide, an alkylated carbamate, a (meth)acrylate, a salt of a polycarboxylic acid with cyclic amidine, o-tolyl biguanide, an isocyanate, a blocked isocyanate, a polyacid, an anhydride, an organometallic acid-functional material, a polyamine, a polyamide, an aminoplast, a carbodiimide, an oxazoline, and/or combinations thereof.

5. The coated substrate of claim 1, wherein the powder coating composition comprises a binder comprising: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth) acrylate polymer reactive with the epoxy functional polymer.

6. The coated substrate of claim 1, wherein the powder coating composition further comprises a thermally conductive, electrically insulative filler material.

7. The coated substrate of claim 6, wherein the thermally conductive, electrically insulative filler material comprises boron nitride, silicon nitride, aluminum nitride, boron arsenide, aluminum oxide, magnesium oxide, dead burn magnesium oxide, beryllium oxide, silicon dioxide, titanium oxide, zinc oxide, nickel oxide, copper oxide, tin oxide, aluminum hydroxide, magnesium hydroxide, boron arsenide, silicon carbide, agate, emery, ceramic microspheres, diamond, or any combination thereof.

8. The coated substrate of claim 6, wherein the thermally conductive, electrically insulative filler material comprises aluminum hydroxide present in an amount of at least 40% by weight, based on the total weight of the powder coating composition.

9. The coated substrate of claim 6, wherein the thermally conductive, electrically insulative filler material comprises dead burned magnesium oxide.

10. The coated substrate of claim 6, wherein the thermally conductive, electrically insulative filler material comprises aluminum hydroxide and dead burned magnesium oxide.

11. The coated substrate of claim 6, wherein the thermally conductive, electrically insulative filler material comprises boron nitride present in an amount of greater than 40% and less than 50% by weight, based on the total weight of the powder coating composition.

12. The coated substrate of claim 6, wherein the thermally conductive, electrically insulative filler material comprises at least two of aluminum hydroxide, dead burned magnesium oxide, and boron nitride.

13. The coated substrate of claim 6, wherein the thermally conductive, electrically insulative filler material comprises aluminum hydroxide and/or boron nitride present in a combined amount of at least 40% by weight, and the total amount of boron nitride present is less than 50% by weight, the % by weight based on the total weight of the powder coating composition.

14. The coated substrate of claim 6, wherein the thermally conductive, electrically insulative filler material comprises dead burned magnesium oxide and boron nitride.

15. The coated substrate of claim 6, wherein the powder coating composition further comprises a thermoplastic material and/or a core-shell polymer.

16. The coated substrate of claim 1, wherein the electrodepositable coating composition comprises a phyllosilicate pigment and/or a fluoropolymer.

17. A method of making the coated substrate of claim 1, composition coating the substrate comprising electrodepositing the electrodepositable coating layer deposited from an electrodepositable coating composition onto a surface of the substrate and applying the powder coating layer on to at least a portion of the electrodepositable coating layer.

18. The coated substrate of claim 1, wherein the electrodepositable coating composition comprises a thermally conductive, electrically insulative filler material.

19. The coated substrate of claim 1, wherein the dry film thickness of the multi-layer coating is at least 3 mils (76.2 microns).

20. The coated substrate of claim 1, wherein the dry film thickness of the multi-layer coating is 3 mils to 5 mils (76.2 microns to 127 microns).

* * * * *